United States Patent [19]

Baird, III

[11] Patent Number: 5,608,843
[45] Date of Patent: Mar. 4, 1997

[54] LEARNING CONTROLLER WITH ADVANTAGE UPDATING ALGORITHM

[75] Inventor: Leemon C. Baird, III, Colorado Springs, Colo.

[73] Assignee: The United States of America as represented by the Secretary of the Air Force, Washington, D.C.

[21] Appl. No.: 283,729

[22] Filed: Aug. 1, 1994

[51] Int. Cl.$^6$ .............................. G06E 1/00; G06E 3/00; G06F 15/18
[52] U.S. Cl. ................................. 395/23; 395/20; 395/21
[58] Field of Search ................................ 382/155–159, 382/20–27; 395/20–27

[56] References Cited

U.S. PATENT DOCUMENTS 5,250,886  10/1993  Yasuhara et al. ..................... 318/567
5,257,343  10/1993  Kyuma et al. ........................ 395/22

OTHER PUBLICATIONS

Leemon C. Baird III, WL-TR-93-1146 Advantage Updating, Nov. 1993, pp. 1–41 Avionic Directorate, Wright Laboratory AFMC, WPAFB.
Yen, "Hybrid learning control in flexible space structures with reconfiguration capability"; Proceedings of the 1994 IEEE International symposium on intelligent control, pp. 321–326, 16–18 Aug. 1994.
Baird, "Function minimization for dynamic programming using connectionist networks"; 1992 IEEE International conference on systems, man and cybernetics, pp. 19–24 vol. 1, 18–21 Oct. 1992.
Baird, "Reinforcement leaving in continuous time: advantage updating"; 1994 IEEE International conference on neural networks, pp. 2448–2453 vol. 4, 27 Jun. –2 Jul. 1994.

Primary Examiner—Tariq R. Hafiz
Attorney, Agent, or Firm—Bernard E. Franz; Thomas L. Kundert; Gerald B. Hollins

[57] ABSTRACT

A new algorithm for reinforcement learning, advantage updating, is proposed. Advantage updating is a direct learning technique; it does not require a model to be given or learned. It is incremental, requiring only a constant amount of calculation per time step, independent of the number of possible actions, possible outcomes from a given action, or number of states. Analysis and simulation indicate that advantage updating is applicable to reinforcement learning systems working in continuous time (or discrete time with small time steps) for which Q-learning is not applicable. Simulation results are presented indicating that for a simple linear quadratic regulator (LQR) problem with no noise and large time steps, advantage updating learns slightly faster than Q-learning. When there is noise or small time steps, advantage updating learns more quickly than Q-learning by a factor of more than 100,000. Convergence properties and implementation issues are discussed. New convergence results are presented for R-learning and algorithms based upon change in value. It is proved that the learning rule for advantage updating converges to the optimal policy with probability one.

10 Claims, 4 Drawing Sheets

1

LEARNING CONTROLLER WITH ADVANTAGE UPDATING ALGORITHM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to an algorithm which is a general learning controller. More particularly, it is an algorithm which stores two functions, and updates them on the basis of reinforcement received from the environment.

The invention has potential uses in aircraft (such as for flight control), vehicles, robots, and manufacturing automation. One of the most general problems in control theory is the problem of creating an optimal controller for a nonlinear, stochastic, poorly modeled system.

The following United States patents are of interest.

U.S. Pat. No. 5,257,343—Kyuma et al

U.S. Pat. No. 5,250,886—Yasuhara et al

None of the above patents disclose an algorithm for reinforcement learning requiring only a constant amount of calculation per time step, independent of the number of possible actions, possible outcomes from a given action, or number of states. The patent to Kyuma et al discloses an intelligence information system composed of an associative memory and a serial processing computer. The patent to Yasuhara et al discloses a method of storing teaching points of a robot. When teaching points for a plurality of moving units are input, information for identifying the moving units associated with the teaching points is input, and the teaching points and the identification data are stored in a single area of a memory.

References

Baird, L. C. (1992). Function minimization for dynamic programming using connectionist networks. *Proceedings of the IEEE Conference on Systems, Man, and Cybernetics* (pp. 19–24). Chicago, Ill.

Baird, L. C., & Klopf, A. H. (1993a). A hierarchical network of provably optimal learning control systems: Extensions of the associative control process (ACP) network. *Adaptive Behavior*, 1(3), 321–352.

Baird, L. C., & Klopf, A. H. (1993b). *Reinforcement Learning with High-Dimensional, Continuous Actions*. To appear as a United States Air Force technical report.

Bertsekas, D. P. (1987). *Dynamic Programming: Deterministic and Stochastic Models*. Englewood Cliffs, N.J.: Prentice-Hall.

Bradtke, S. J. (1993). Reinforcement learning applied to linear quadratic regulation. *Proceedings of the Fifth Conference on Neural Information Processing Systems* (pp. 295–302). Morgan Kaufmann.

Gullapalli, V. (1990). A stochastic reinforcement learning algorithm for learning real-valued functions. *Neural Networks*, 3, 671–692

Jaakkola, T., Jordan, M. I., & Singh, S. P. (1993). *On the Convergence of Stochastic Iterative Dynamic Programming Algorithms* (Tech. Rep. 9307). Department of Brain and Cognitive Sciences, Massachusetts Institute of Technology, Cambridge, Mass.

Jacobson, D. H., & Mayne, D. Q. (1970). *Differential Dynamic Programming*. New York: American Elsevier Publishing Company.

Klopf, A. H., Morgan, J. S., & Weaver, S. E. (1993). A hierarchical network of control systems that learn: Modeling nervous system function during classical and instrumental conditioning. *Adaptive Behavior*, 1(3), 263–319.

Nguyen, D. H., & Widrow, B. (1990). Neural networks for self-learning control systems. *IEEE Control Systems Magazine*, (April), 18–23.

Ross, S. (1983). *Introduction to Stochastic Dynamic Programming*. New York: Academic Press.

Schwartz, A. (1993). A reinforcement learning method for maximizing undiscounted rewards. *Proceedings of the Tenth International Conference on Machine Learning* (pp. 298–305). Amherst, Mass.

Sutton, R. S. (1990a). Integrated architectures for learning, planning, and reacting based on approximating dynamic programming. *Proceedings of the Seventh International Conference on Machine Learning*.

Sutton, R. S. (1990b). Talk on a new performance measure for reinforcement learning, presented at GTE laboratories, Waltham, Mass., 11 September.

Tesauro, G. (1992). Practical issues in temporal difference learning. *Machine Learning*, 8(3/4), 257–277.

Watkins, C. J. C. H. (1989). *Learning from delayed rewards*. Doctoral thesis, Cambridge University, Cambridge, England.

Watkins, C. J. C. H., & Dayan, P. (1992). Technical note: Q-learning. *Machine Learning*, 8(3/4), 279–292.

White, D. A., & Sofge, D. A. (1990). Neural network based process optimization and control. *Proceedings of the 29th Conference on Decision and Control.* (pp. 3270–3276), Honolulu, Hi.

White, D. A., & Sofge, D. A. (Eds.). (1992). *Handbook of Intelligent Control: Neural, Fuzzy, and Adaptive Approaches*. New York: Van Nostrand Reinhold.

Williams, R. J., & Baird, L. C. (1990). A mathematical analysis of actor-critic architectures for learning optimal control through incremental dynamic programming. *Proceedings of the Sixth Yale Workshop on Adaptive and Learning Systems* (pp. 96–101). New Haven, Conn.

Williams, R. J., & Baird, L. C. (1993). *Analysis of Some Incremental Variants of Policy Iteration: First Steps Toward Understanding Actor-Critic Learning Systems*. (Tech. Rep. NU-CCS-93-11). Boston, Mass.: Northeastern University, College of Computer Science.

SUMMARY OF THE INVENTION

One of the most general problems in control theory is the problem of creating an optimal controller for a nonlinear, stochastic, poorly modeled system. Almost any control problem can be viewed as being a problem of this type. An objective of the invention is to provide an improved algorithm for reinforcement learning. The invention is an algorithm that can learn to be an optimal controller for a nonlinear stochastic system, even if no model is initially known. As shown in the block diagram of FIG. 8, the controller 80 controls a plant 82.

The Advantage Updating controller 80 is made of several components. As shown in FIG. 9, these may comprise a unit 90 for equations for actions selection and learning, a unit 92 for a value function, and a unit 94 for the advantage function. The actuators 96 and the sensors 97 and 98 may be considered as part of the plant 82. A computer code listing maybe found at the end of this specification.

The invention relates to an algorithm which is a learning controller. The algorithm stores two functions, and updates them on the basis of reinforcements received from the environment. The new algorithm for reinforcement learning, advantage updating, is a direct learning technique; it does not require a model to be given or learned. It requires only a constant amount of calculation per time step, independent of the number of possible actions, possible outcomes from a given action, or number of states. Analysis and simulation indicate that advantage updating is applicable to reinforcement learning systems working in continuous time (or discrete time with small time steps) for which Q-learning (the current method used for updating) is not applicable. Simulation results are presented indicating that for a simple Linear Quadratic Regulator (LQR) problem with no noise and large time steps, advantage updating learns slightly faster than Q-learning. When there is noise or small time steps, advantage updating learns more quickly than Q-learning by a factor of more than 100,000.

For learning, perform action $u_t$ in state $x_t$, leading to state $x_{t+\Delta t}$ and reinforcement $R_{\Delta t}(x_t, u_t)$. Update A. This changes $A_{max}$. Update V based on the change in $A_{max}$. For normalizing, choose an action u randomly, with uniform probability. Perform action u in state x, and update A:

$$A(x_t, u_t) \xleftarrow{\alpha} A_{max}(x_t) + \frac{\gamma^{\Delta t}V(x_{t+\Delta t}) + R_{\Delta t}(x_t, u_t) - V(x_t)}{\Delta t}$$

$$V(x_t) \xleftarrow{\beta} V(x_t) + \frac{A_{max_{new}}(x_t) - A_{max_{old}}(x_t)}{\alpha}$$

$$\left.\begin{matrix}\end{matrix}\right\} \text{learning updates}$$

$$A(x, u) \xleftarrow{\omega} A(x, u) - A_{max}(x) \quad \Big\} \text{ normalizing update}$$

Where $$X \xleftarrow{\alpha} Y$$

means that a supervised learning system (function approximation system) that gives an output of X is trained instead to give an output of Y. That is, the desired output is Y. The training uses a learning rate of $\alpha$. For a lookup table, this is equivalent to replacing the entry X in the table with the value $(1-\alpha)X+\alpha Y$. For continuous time, the equations are found by taking the limit as $\Delta t$ goes to zero, so the second two updates remain unchanged, and the first update becomes:

For optimal control, where the goal is to maximize total discounted reinforcement, u is a scalar or a vector, and $A_{max}$ is defined as:

$$A_{max}(x) = \max_u A(x, u)$$

For differential games, u is a vector (u',u") where u' is the action performed by the player trying to minimize total discounted reinforcement, and u" is the action performed by the player trying to maximize total discounted reinforcement. The actions u' and u" can be either vectors or scalars. $A_{max}$ is defined as:

$$A_{max}(x) = \min_{u'} \max_{u''} A(x, u', u'')$$

This finds the optimal policy for games for which a saddlepoint exists. If no saddlepoint exists, then it finds the optimal policy for the game in which the minimizing player is constrained to use a deterministic policy, and the maximizing player knows the minimizing player's policy before choosing his own policy. Advantage updating learning is equivalent to Q-learning when:

$$\beta = \alpha \Delta t$$

$$Q = (A - A_{max})\Delta t + V.$$

The residual gradient form of advantage updating is applicable to learning with an arbitrary function-approximation system. The change in an arbitrary weight W should be:

$$\Delta W = \alpha \left( \frac{1}{\Delta t} (R_{\Delta t}(x_t, u_t) + \gamma^{\Delta t}<V(x_{t+\Delta t})> - V(x_t)) + \right.$$

$$A_{max}(x_t) - A(x_t, u_t) \right) \cdot \left( \frac{1}{\Delta t} \left( \gamma^{\Delta t} \frac{\partial V(x_{t+\Delta t})}{\partial W} - \frac{\partial V(x_t)}{\partial W} \right) + \right.$$

$$\left. \left( \frac{\partial A_{max}(x_t)}{\partial W} - \frac{\partial A(x_t, u_t)}{\partial W} \right) \right) - \alpha A_{max}(x_t) \frac{\partial A_{max}(x_t)}{\partial W}$$

where $<V(x_{t+\Delta t})>$ is the expected value of the next state, considering possible next states for the given state $x_t$ and action $u_t$.

DETAILED DESCRIPTION

Figure 1A:
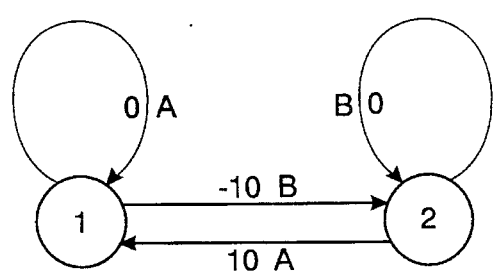
FIGS. 1a and 1b are diagrams showing a deterministic MDP with two states and two actions for which R-learning converges, but does not learn to distinguish the T-optimal policy from nonoptimal policies.

The invention is disclosed in a technical report WL-TR-93-1146 by Leemon C. Baird III, titled "Advantage Updating", November, 1993, published by the Avionics Directorate, Wright Laboratory, Air Force Material Command, Wright Patterson AFB 45433-7409. A copy of the report is included with the application as filed with the Disclosure Statement, and is hereby incorporated by reference.

REINFORCEMENT LEARNING SYSTEMS

A reinforcement learning system typically uses a set of real-valued parameters to store information that is learned. When a parameter is updated during learning, the notation $$W \leftarrow K \tag{1}$$

represents the operation of instantaneously changing the parameter W so that its new value is K, whereas $$W \xleftarrow{\alpha} K \tag{2}$$

represents the operation of moving the value of W toward K. This is equivalent to $$W_{new} \leftarrow (1-\alpha)W_{old} + \alpha K \tag{3}$$

where the learning rate $\alpha$ is a small positive number. Appendix A summarizes this and other notation conventions.

A Markov sequential decision process (MDP) is a system that changes its state as a function of its current state and inputs received from a controller. The set of possible states for a given MDP, and the set of possible actions from which the controller can choose, may each be finite or infinite. At time t, the controller chooses an action $u_t$, based upon the state of the MDP, $x_t$. The MDP then transitions to a new state $x_{t+\Delta t}$ where $\Delta t$ is the duration of a time step. The state transition may be stochastic, but the probability $P(u_t, x_t, x_{t+\Delta t})$ of transitioning from state $x_t$ to state $x_{t+\Delta t}$ after performing action $u_t$ is a function of only $x_t$, $x_{t+\Delta t}$ and $u_t$, and is not affected by previous states or actions. If there are a finite set of possible states and actions, then $P(u_t, x_t, x_{t+\Delta t})$ is a probability. If there are a continuum of possible states or actions, then $P(u_t, x_t, x_{t+\Delta t})$ is a probability density function (PDF). If time is continuous rather than discrete, then $P(u_t, x_t, x_t)$ is the probability that action $u_t$ will cause the rate of change of the state to be $x_t$. The MDP also sends the controller a scalar value known as reinforcement. If time is discrete, then the total reinforcement received by the controller during time step t is $R_{\Delta t}(x_t, u_t)$. If time is continuous, then the rate of flow of reinforcement at time t is $r(x_t, u_t)$.

A reinforcement learning problem is the problem of determining which action is best in each state in order to maximize some function of the reinforcement. The most common reinforcement learning problem is the problem of finding actions that maximize the expected total discounted reinforcement, which for continuous time is defined as $$E\left(\int_0^\infty \gamma^t r(x_t, u_t) dt\right) \tag{4}$$

where $E(\cdot)$ denotes expected value, and where $0 < g\pi 1$ is the discount factor which determines the relative significance of early versus later reinforcement. For discrete time, the total discounted reinforcement received during one time step of duration $\Delta t$ when performing action ut in state $x_t$ is defined as:

$$R_{\Delta t}(x_t, u_t) = \int_t^{t+\Delta t} \gamma^{\tau-t} r(x_\tau, u_\tau) d\tau \tag{5}$$

The goal for a discrete-time controller is to find actions that maximize the expected total discounted reinforcement:

$$E\left(\sum_{i=0}^\infty (\gamma^{\Delta t})^i R_{\Delta t}(x_{i \cdot \Delta t}, u_{i \cdot \Delta t})\right) \tag{6}$$

This expression is often written with $\Delta t$ not shown and with $\gamma$ chosen to implicitly reflect $\Delta t$, but is written here with the $\Delta t$ shown explicitly so that expression (6) will reduce to expression (4) in the limit as $\Delta t$ goes to zero. A policy, $\pi(x)$, is a function that specifies a particular action for the controller to perform in each state x. The optimal policy for a given MDP, $\pi^*(x)$, is a policy such that choosing $u_t = \pi^*(x_t)$ results in maximizing the total discounted reinforcement for any choice of starting state. If reinforcement is bounded, then at least one optimal policy is guaranteed to exist. The value of a state, $V^*(x)$, is the expected total discounted reinforcement received when starting in state x and choosing all actions in accordance with an optimal policy. The functions stored in a learning system at a given time are represented by variables without superscripts such as $\pi$, V, A, or Q. The true, optimal functions that are being approximated are represented by * superscripts, such as $\pi^*$, $V^*$, $A^*$, or $Q^*$.

Expression (6) is the most common performance measure for defining a reinforcement learning problem, but it is not the only conceivable measure. For example, Sutton (1990b) and others have considered a different performance measure, which Schwartz (1993) calls T-optimality. For this performance measure, the problem is to find a policy that maximizes the average reinforcement r, which is defined as:

$$\rho = \lim_{n \to \infty} \frac{\sum_{i=0}^{n-1} E(R_{\Delta t}(x_{i \cdot \Delta t}, u_{i \cdot \Delta t}))}{n} \tag{7}$$

A policy that maximizes r is always defined to be better than a policy that does not maximize r. If two policies both maximize r, then the better policy is defined to be the one with the larger average adjusted value s, which is defined as:

$$\sigma = \lim_{n \to \infty} \frac{\sum_{m=0}^{n-1} \sum_{i=0}^{m-1} E(R_{\Delta t}(x_{i \cdot \Delta t}, u_{i \cdot \Delta t}) - \rho)}{n} \tag{8}$$

A policy is said to be T-optimal if it maximizes r and has the largest s of all the policies that maximize r. This means that a learning system using this performance measure will first try to maximize the average of all future reinforcements. If there is time, and several policies that all maximize the average reinforcement, then it will choose the policy that also maximizes near-term reinforcement. T-optimal policies do not always exist for every MDP. If T-optimal policies do exist for a given MDP, they may all be nonstationary, so that the optimal action in a given state may not be a deterministic function of the state alone (Ross, 1983). If stationary T-optimal policies exist, it is not clear how to learn them. A reinforcement learning system is a system that is capable of solving reinforcement learning problems. One reinforcement learning system for finding T-optimal policies has been proposed by Schwartz (1993). The algorithm requires that an R value be stored for each state-action pair, and that a global scalar r be stored. R values are represented here by script letters ($\mathcal{R}$) to distinguish them from reinforcement (R). The update rules for R-learning are as follows, where the learning system performs action u in state x, resulting in reinforcement R and a transition to state x':

$$\mathcal{R}(x,u) \xleftarrow{\beta} R_{\Delta t}(x,u) - \rho + \max_u \mathcal{R}(x',u) \quad (9)$$

If the action performed follows the current policy, then:

$$\rho \xleftarrow{\alpha} R_{\Delta t}(x,u) + \max_{u'} \mathcal{R}(x',u') - \max_{u'} \mathcal{R}(x,u') \quad (10)$$

It is not clear whether R-learning will always cause the R values to converge. Even when R-learning does converge, and a stationary T-optimal policy does exist, it is still possible for R-learning to converge to the wrong answer. FIG. 1 shows one example where R-learning has converged, but the final R values erroneously indicate that all possible policies are equally good. This MDP has the property that any policy under consideration has a single average reward independent of the initial state. It might be expected that this property would ensure that whenever R-learning converges it must arrive at a T-optimal policy, but that is not the case. R-learning is a recent development, and it is possible that future versions of R-learning will avoid this difficulty. The use of undiscounted performance measures in reinforcement learning is an important question and deserves further research, but due to the current difficulties with using the T-optimality performance measure, it will not be considered further here. The following discussions and results all pertain to the problem of maximizing the standard performance measure (expected discounted reinforcement) given in expression (6).

Figure 1B:
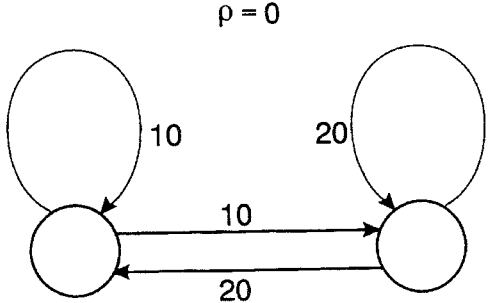

FIGS. 1a and 1b are diagrams showing a deterministic MDP with two states and two actions for which R-learning converges, but does not learn to distinguish the T-optimal policy from nonoptimal policies. T-optimal is the undiscounted performance measure defined by Schwartz (1993).

FIG. 1a shows the names of the states (1 and 2) and actions (A and B). It also shows the immediate reinforcement received when performing each action in each state (−10, 0, and 10). FIG. 1b shows the initial R values before learning starts. Initially, r=0, which is correct because all possible policies yield an average reinforcement of zero when starting in any state. This MDP has the property that any policy under consideration has a single average reward independent of the initial state. It might be expected that this property would ensure that whenever R-learning converges it must arrive at a T-optimal policy, but that is not the case. The T-optimal policy is to choose action A in both states. The worst possible policy is to choose action B in both states. The initial R values erroneously indicate that all possible policies are equally good. Repeated applications of the R-learning update rules result in no changes to r or to any of the R values. Therefore, R-learning will never discover that the policy of always choosing A is better than the policy of always choosing B.

One of the earliest methods for finding policies that maximize expression (6) is the algorithm known as value iteration (or simply called the dynamic programming algorithm by Bertsekas, 1987). Value iteration is an algorithm for finding the optimal policy $\pi^*$, given the transition probabilities P and the reinforcement function R. Value iteration stores a value V(x) for each state x. The values are initialized to arbitrary numbers, and then are updated repeatedly according to the update rule:

$$V(x) \leftarrow \max_u \left[ R_{\Delta t}(x,u) + \gamma^{\Delta t} \sum_{x'} P(u,x,x')V(x') \right] \quad (11)$$

If this procedure is performed infinitely often in every state, then each value V(x) is guaranteed to converge to the optimal value $V^*(x)$. For a given MDP, the function $V^*(x)$ is the unique solution to the Bellman equation:

$$V(x) = \max_u \left[ R_{\Delta t}(x,u) + \gamma^{\Delta t} \sum_{x'} P(u,x,x')V(x') \right] \quad (12)$$

After convergence, the optimal policy is implied by the value function, and can be found quickly:

$$\pi^*(x) = \arg\max_u \sum_{x'} P(u,x,x')[R_{\Delta t}(x,u) + \gamma^{\Delta t}V^*(x')] \quad (13)$$

Simple value iteration is not well suited, however, for reinforcement learning in general. First, it requires that the probabilities and reinforcement function be known. If they are not known, then a separate learning procedure must estimate them. If there are n possible states and m possible actions, the algorithm requires O(nm) calculations to perform a single update. If there is a continuum of possible states and actions, then the summation becomes an integral, and the maximization is performed over an infinite set of integrals. If each state and action is a high-dimensional vector, then an approximation to update (11) will typically require O(nm) calculations, where n and m each scale exponentially with the dimension.

The scaling problems of value iteration can be addressed by more incremental algorithms that require fewer calculations per update. Such algorithms typically store more information than just the V(x) that is stored during learning for value iteration. For example, an algorithm might store both an estimate of the optimal value of each state, V(x), and an estimate of the optimal action for each state, π(x). There are various incremental, asynchronous algorithms for learning with such a system. Unfortunately, these typically require that π(x) change instantaneously during an update, which may not be possible if π(x) is stored in a general function approximation system such as a neural network. Function approximation systems typically change gradually rather than instantaneously. Also, these algorithms are not guaranteed to converge, even when there are only a finite number of states and actions (Williams and Baird, 1990, 1993).

For systems with a continuum of states and actions, differential dynamic programming (Jacobson and Mayne, 1970) avoids the need to instantaneously change the policy. This algorithm is typically used to find an optimal trajectory from a single starting state to a single final state. A policy is found (by some other means) that leads from the start state to the final state. The value function is then calculated for the states along the trajectory. The update rule for differential dynamic programming then causes incremental changes in the value and policy function so that the trajectory is slowly changed to increase the total reinforcement. This algorithm is similar to the backpropagation through time algorithm (Nguyen and Widrow 1990), which first learns a model of the system being controlled, then improves the policy through gradient descent. Unfortunately, both of these algorithms are susceptible to local optima; the final policy will be such that it cannot be improved by an infinitesimal change, but there may be an entirely different policy that is much better.

Instead of storing a value and a policy, a learning system could instead store a value V(x) for each state and a change in value ΔV(x,u) for each state-action pair. The change in value ΔV(x,u) would represent the expected difference between the value of state x and the value of the state reached by performing action u in state x. This allows a more incremental algorithm than value iteration, because it is possible to avoid summing over all possible outcomes for a given action in a given state, and it is no longer necessary to know a model of the MDP. After performing action u in state x causing a transition to state x', the change in value could be updated according to update (14).

$$\Delta V(x,u) \leftarrow R_{\Delta t}(x,u) + \gamma^{\Delta t} V(x') - V(x) \tag{14}$$

After performing update (14), if ΔV(x,u) is the maximum ΔV in state x, (i.e. action u is the current policy), then update (15) should also be performed.

$$V(x) \leftarrow R + \gamma^{\Delta t} V(x') \tag{15}$$

Figure 2A:
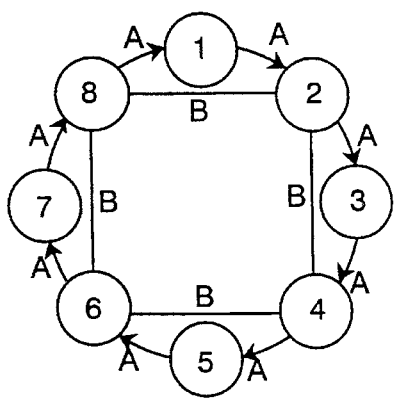
FIGS. 2a and 2b are diagrams showing a deterministic MDP with eight states, two actions, and a time step $\Delta t=1$ for which the action updates are not guaranteed to converge.
Figure 2B:
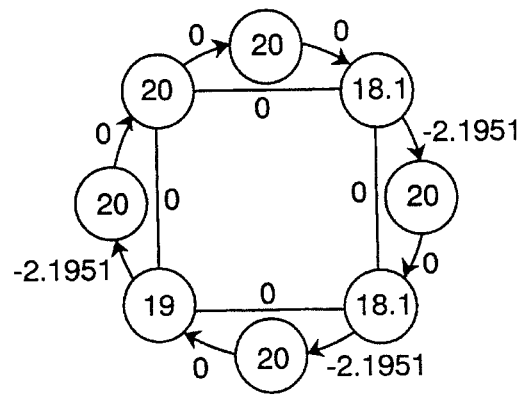

FIGS. 2a and 2b are diagrams showing a deterministic MDP with eight states, two actions, and a time step Δt=1 for which the updates (14) and (15) are not guaranteed to converge. The name of each state and action is shown in FIG. 2a. Action A yields an immediate reinforcement of 2, and action B yields an immediate reinforcement of 1. The initial value in each state, V(x), and initial change of value for each state-action pair, ΔV(x,u), are shown in FIG. 2b. The parameters fail to converge when the sequence of updates {2B, 1A, 2A, 8A, 8B, 1A, 6B,
4B, 3A, 4A, 2A, 2B, 3A, 8B,
6B, 5A, 6A, 4A, 4B, 5A, 2B,
8B, 7A, 8A, 6A, 6B, 7A, 4B} is repeated infinitely often, where the numbers are states and the letters are actions. After performing the first row of updates, all parameters have shifted clockwise two states. After performing all four rows of updates, all parameters have been updated at least once, and all parameters have returned to their initial values. The optimal policy is to choose action A in every state. The worst policy is to choose action B whenever possible. The initial parameters cause the learning system to classify the worst policy as being optimal, and this is still the case after the above sequence has been repeated arbitrarily often. The worst policy continues to be classified as optimal, even if the initial parameters are perturbed slightly.

The idea of storing both the value function and the change in value (or rate of change of value) was found to be useful in one application by White and Sofge (1990, 1992), who incorporated this idea into a larger system that also included a stored policy. However, the obvious algorithm for updating such stored functions, updates (14) and (15), is not guaranteed to converge, even for a simple, deterministic MDP with only eight states, two actions, and time step Δt=1. FIG. 2 shows an example for which this algorithm does not converge. For this MDP, the optimal policy is action A in every state. The worst policy is B whenever possible. The initial ΔV function implies that the worst policy is considered to be optimal by the learning system. Thus, not only does the learning system fail to converge to the optimal policy, it also periodically implies the worst possible policy. Also, the parameter values shown in FIG. 2 constitute an attractor; if the initial parameter values are changed slightly, then after each sequence of updates they will move toward the parameter values in FIG. 2. Updates (14) and (15) change the parameters instantaneously. If there were an α above the arrow, to represent a more gradual change, then the modified algorithm would also fail to converge for this counterexample. Each gradual update shown in the sequence in FIG. 2 would simply be repeated several times. An instantaneous update can always be approximated by repeating a gradual update. There are other modifications that could be imagined for updates (14) and (15), but it is not apparent how to modify them to ensure convergence to optimality. It is not clear how a reinforcement learning system could be built that stores only V and ΔV (or that stores V, ΔV, and a policy) and that is guaranteed to converge to the optimal policy.

Another approach is to store a probability of choosing each action in each state, rather than a single policy action for each state. This approach has been used, for example, by Gullapalli (1990). This approach requires that the controller choose actions according to the stored probabilities during learning. The probabilities typically converge to a deterministic policy, so exploration by the learning system must decrease over time. This prevents the issue of exploration from being addressed separately from the issue of learning. It would be useful to have a general algorithm that was guaranteed to learn when observing any sequence of actions, not just actions chosen according to specific probabilities. For such an algorithm, the exploration mechanism could be designed freely, without concern that it might prevent convergence of the learning algorithm.

Q-learning is an algorithm that avoids the problems of the above algorithms. It is incremental, direct (does not need a model of the MDP), and guaranteed to converge, at least for the discrete case with a finite number of states and actions. Furthermore, it can learn from any sequence of experiences in which every action is tried in every state infinitely often. Instead of storing values and policies, Q-learning stores Q values. For a given state x and action u, the optimal Q value, $Q^*(x,u)$, is the expected total discounted reinforcement that is received by starting in state x, performing action u on the first time step, then performing optimal actions thereafter. The maximum Q value in a state is the value of that state. The action associated with the maximum Q value in a state is the policy for that state. Initially, all Q values are set to arbitrary numbers. After an action u is performed in state x, the result is observed and the Q value is updated:

$$Q(x,u) \xleftarrow{\alpha} T_{\Delta t}(x,u) + \gamma^{\Delta t} \max_u Q(x',u) \tag{16}$$

The equivalent of the Bellman equation for Q-learning is $$Q(x,u) = R_{\Delta t}(x,u) + \gamma^{\Delta t} \sum_{x'} P(u,x,x') \max_{u'} Q(x',u') \tag{17}$$

The optimal Q function, $Q^*(x,u)$, is the unique solution to equation (17). The policies implied by $Q^*$, policies that always choose actions that maximize $Q^*$, are optimal policies.

Update (16) does not require a model of the MDP, nor does it contain any summations or integrals. The computational complexity of a single update is independent of the number of states. If the Q values are stored in a lookup table, then the complexity is linear in the number of actions, due to the time that it takes to find the maximum. However, the term being maximized is a stored function, not a calculated expression. This suggests that if Q is stored in an appropriate function approximation system, it might be possible to reduce even this part of the update to a constant-time algorithm. One algorithm that does this is described in Baird (1992). Another method, wire fitting, is described in Baird and Klopf (1993b). In both cases, the maximization of the function is performed incrementally during learning, rather than requiring an exhaustive search for each update. Q-learning therefore appears to have none of the disadvantages of any of the algorithms described above, and the computational complexity per update is constant. Reinforcement learning systems based on discrete Q-learning are described in Baird and Klopf (1993a), and Klopf, Morgan, and Weaver (1993).

Q-learning requires relatively little computation per update, but it is useful to consider how the number of updates required scales with noise or with the duration of a time step, $\Delta t$. An important consideration is the relationship between Q values for the same state, and between Q values for the same action. The Q values $Q(x, u_1)$ and $Q(x, u_2)$ represent the long-term reinforcement received when starting in state x and performing action $u_1$ or $u_2$ respectively, followed by optimal actions thereafter. In a typical reinforcement learning problem with continuous states and actions, it is frequently the case that performing one wrong action in a long sequence of optimal actions will have little effect on the total reinforcement. In such a case, $Q(x, u_1)$ and $Q(x, u_2)$ will have relatively close values. On the other hand, the values of widely separated states will typically not be close to each other. Therefore $Q(x_1,u)$ and $Q(x_2,u)$ may differ greatly for some choices of $x_1$ and $x_2$. The policy implied by a Q function is determined by the relative Q values in a single state. If the Q function is stored in a function approximation system with some error, the implied policy will tend to be sensitive to that error. As the time step duration $\Delta t$ approaches zero, the penalty for one wrong action in a sequence decreases, the Q values for different actions in a given state become closer, and the implied policy becomes even more sensitive to noise or function approximation error. In the limit, for continuous time, the Q function contains no information about the policy. Therefore, Q-learning would be expected to learn slowly when the time steps are of short duration, due to the sensitivity to errors, and it is incapable of learning in continuous time. This problem is not a property of any particular function approximation system; rather, it is inherent in the definition of Q values.

THE ADVANTAGE UPDATING ALGORITHM

Reinforcement learning in continuous time is possible through the use of advantage updating. The advantage updating algorithm is a reinforcement learning algorithm in which two types of information are stored. For each state x, the value V(x) is stored, representing the total discounted return expected when starting in state x and performing optimal actions. For each state x and action u, the advantage, A(x,u), is stored, representing the degree to which the expected total discounted reinforcement is increased by performing action u (followed by optimal actions thereafter) relative to the action currently considered best. After convergence to optimality, the value function $V^*(x)$ represents the true value of each state. The advantage function $A^*(x,u)$ will be zero if u is the optimal action (because u confers no advantage relative to itself) and $A^*(x,u)$ will be negative for any suboptimal u (because a suboptimal action has a negative advantage relative to the best action). For a given action u, the Q value $Q^*(x,u)$ represents the utility of that action, the change in value $\Delta V^*(x,u)$ represents the incremental utility of that action, and the advantage $A^*(x,u)$ represents the utility of that action relative to the optimal action. The optimal advantage function $A^*$ can be defined in terms of the optimal value function $V^*$:

$$A^*(x,u) = \frac{1}{\Delta t} \left[ R_{\Delta t}(x,u) - V^*(x) + \gamma^{\Delta t} \sum_{x'} P(u,x,x') V^*(x') \right] \quad (18)$$

The definition of an advantage includes a $1/\Delta t$ term to ensure that, for small time step duration $\Delta t$, the advantages will not all go to zero. Advantages are related to Q values by:

$$A^*(x,u) = \frac{1}{\Delta t} \left[ Q^*(x,u) - \max_{u'} Q^*(x,u') \right] \quad (19)$$

Both the value function and the advantage function are needed during learning, but after convergence to optimality, the policy can be extracted from the advantage function alone. The optimal policy for state x is any u that maximizes $A^*(x, u)$. The notation $A_{max}(x)$ is defined as:

$$A_{max}(x) = \max_u A(x,u) \quad (20)$$

If $A_{max}$ is zero in every state, then the advantage function is said to be normalized. $A_{max}$ should eventually converge to zero in every state. The update rules for advantage updating in discrete time are as follows:

Advantage Updating

LEARN: perform action $u_t$ in state $x_t$ $$A(x_t, u_t) \xleftarrow{\alpha} A_{max}(x_t) + \frac{R_{\Delta t}(x_t,u_t) + \gamma^{\Delta t}V(x_{t+\Delta t}) - V(x_t)}{\Delta t} \quad (21)$$

$$V(x_t) \xleftarrow{\beta} V(x_t) + [A_{max_{new}}(x_t) - A_{max_{old}}(x_t)]/\alpha \quad (22)$$

NORMALIZE: pick an arbitrary state x and pick an action u randomly with uniform probability $$A(x,u) \xleftarrow{\omega} A(x,u) - A_{max}(x) \quad (23)$$

For the learning updates, the system performs action $u_t$ in state $x_t$ and observes the reinforcement received, $R_{\Delta t}(x_t,u_t)$, and the next state, $x_{t+\Delta t}$. The advantage and value functions are then updated according to updates (21) and (22). Update (21) modifies the advantage function A(x,u). The maximum advantage in state x prior to applying update (21) is $A_{max_{old}}(x)$. After applying update (21) the maximum is $A_{max_{new}}(x)$. If these are different, then update (22) changes the value V(x) by a proportional amount. As $\alpha$ goes to zero, the change in $A_{max}$ goes to zero, but the change in $A_{max}$ in update (22) is divided by $\alpha$, so the value function will continue to learn at a reasonable rate as $\alpha$ decreases. Advantage updating can be applied to continuous-time systems by taking the limit as $\Delta t$ goes to zero in updates (21), (22), and (23). For (22) and (23), $\Delta t$ can be replaced with zero. Substituting equation (5) into update (21) and taking the limit as $\Delta t$ goes to zero yields:

$$A(x_t,u_t) \xleftarrow{\alpha} A_{max}(x_t) + V(x_t)\ln\gamma + \dot{V}(x_t) + r(x_t,u_t) \quad (24)$$

The learning updates, (21), (22), and (24), require interaction with the MDP or a model of the MDP, but the normalizing update, (23), does not. Normalizing updates can always be performed by evaluating and changing the stored functions independent of the MDP. Normalization is done to ensure that after convergence $A_{max}(x)=0$ in every state. This avoids the representation problem noted above for Q-learning, where the Q function differs greatly between states but differs little between actions in the same state. Learning and normalizing can be performed asynchronously. For example, a system might perform a learning update once per time step, in states along a particular trajectory through state space, and perform a normalizing update multiple times per time step in states scattered randomly throughout the state space. The advantage updating algorithm is referred to as "advantage updating" rather than "advantage learning" because it includes both learning and normalizing updates.

The equivalent of the Bellman equation for advantage updating is a pair of simultaneous equations:

$$V(x) + A(x,u)\Delta t = R_{\Delta t}(x,u) + \gamma^{\Delta t} \sum_{x'} P(u,x,x')V(x') \quad (25)$$

$$\max_u A(x,u) = 0 \quad (26)$$

The unique solution to this set of equations is the optimal value and advantage functions $V^*(x)$ and $A^*(x,u)$. This can be seen by considering an arbitrary state x and the action $u_{max}$ that maximizes the advantage in that state. For a given state, if (25) is satisfied, then the action that maximizes A will also maximize the right side of (25). If the advantage function satisfies (26), then $A(x,u_{max})=0$. Equation (25) then reduces to equation (12), which is the Bellman equation. The only solution to this equation is $V=V^*$, so $V^*$ is the unique solution to equations (25) and (26). Given that $V=V^*$, equation (25) can be solved for A, yielding equation (18), so the unique solution to the set of equations (25) and (26) is the pair of functions $A^*$ and $V^*$.

The pair of equations (25) and (26) has the same unique solution as the pair (27) and (28), because equation (28) ensures that $A_{max}(x)$ is zero in every state.

$$V(x) + (A(x,u) - A_{max}(x))\Delta t = R_{\Delta t}(x,u) + \gamma^{\Delta t} \sum_{x'} P(u,x,x')V(x') \quad (27)$$

$$\max_u A(x,u) = 0 \quad (28)$$

If, in state x, a large constant were added to each advantage $A^*(x,u)$ and to the value $V^*(x)$, then the resulting advantage and value functions would still satisfy equation (27). However, the advantage function would not satisfy equation (28), and so would be referred to as an unnormalized advantage function. Such a function would still be useful, because the optimal policy can be calculated from it, but it could be difficult to represent in a function approximation system. The learning updates (21) and (22) find value and advantage functions that satisfy (27). The normalizing updates (22) and (23) ensure that the advantage function will be normalized, and so will satisfy (28) as well.

The update rules for advantage updating have a significant property: there are time derivatives in the update rules, but no gradients or partial derivatives. At time t, it is necessary to know $A_{max}(t)$ and the value and rate of change of V(t) while performing the current action. It is not necessary to know the partial derivative of V or A with respect to state or action. Nor is it necessary to know the partial derivative of next state with respect to current state or action. Only a few of the recent values of V need to be known in order to calculate the time derivative; there is no need for models of the system being controlled. Existing methods for solving continuous-time optimization problems, such as value iteration or differential dynamic programming, require that models be known or learned, and that partial derivatives of models be calculated. For a stochastic system controlled by a continuum of actions, previous methods also require maximizing over a set of one integral for each action. Advantage updating does not require the calculation of an integral during each update operation, and maximization is only done over stored values. For this reason, advantage updating appears useful for controlling stochastic systems, even if a model is already known with perfect accuracy. If the model is known, then the system can learn by interacting with the model as in the Dyna system (Sutton, 1990a). Table 1 compares advantage updating with several other algorithms.

|  | Information stored for state x, action u | Update rules | Direct | Converge to $\pi^*$ | Cont. time |
|---|---|---|---|---|---|
| R-learning | R(x, u) <br> r | $R \xleftarrow{\beta} R - \rho + \max R'$ <br> If following the policy then: <br> $\rho \xleftarrow{\alpha} R + \max R' - \max R$ | yes | no | no |
| Value iteration | V(x) | $V \xleftarrow{\alpha} R + \gamma^{\Delta t} \max V'$ | no | yes | yes |
| Change in value | V(x) <br> $\Delta V(x, u)$ | $\Delta V \xleftarrow{\alpha} (R + \gamma^{\Delta t} V' - V)/\Delta t$ <br> If following the policy then: <br> $V \xleftarrow{\beta} R + \gamma^{\Delta t} V'$ | yes | no | yes |
| Q-learning | Q(x, u) | $Q \xleftarrow{\alpha} R + \gamma^{\Delta t} \max Q'$ | yes | yes | no |
| Advantage updating | V(x) <br> A(x, u) | $A \xleftarrow{\alpha} A_{max} + (R + \gamma^{\Delta t} V' - V)/\Delta t$ <br> $V \xleftarrow{\beta} V + \Delta A_{max}/\alpha$ <br> For a randomly, uniformly chosen action: <br> $A \xleftarrow{\omega} A - A_{max}$ | yes | yes | yes |

Table 1. Comparison of several algorithms applicable to reinforcement learning problems.

In Table 1, equations are given in a simplified form, where primed letters represent information associated with the next state and unprimed letters represent information associated with the current state. See the adjacent text for a more detailed form of the equations. The fourth Table 1 column gives the equivalent of the Bellman equation; the unique solution to this equation or set of equations is the optimal function or functions that should be learned. R-learning is not guaranteed to learn to reject suboptimal policies. Value iteration is not direct; it requires a model to be known or learned, and it requires the calculation of the maximum of an infinite set of integrals to perform one update. The algorithms described in the text that are based on storing a change in value are not guaranteed to converge, even for a deterministic MDP with only eight states. Q-learning and R-learning do not work in continuous time, and are sensitive to function-approximation errors when the time step is small. Advantage updating is direct, is guaranteed to converge for an MDP with finite states and actions, and is appropriate for continuous-time systems or systems with small time steps.

A LINEAR QUADRATIC REGULATOR PROBLEM

Linear Quadratic Regulator (LQR) problems are commonly used as test beds for control systems, and are useful benchmarks for reinforcement learning systems (Bradtke, 1993). The following linear quadratic regulator (LQR) control problem can serve as a benchmark for comparing Q-learning to advantage updating in the presence of noise or small time steps. At a given time t, the state of the system being controlled is the real value $x_t$. The controller chooses a control action $u_t$ which is also a real value. The dynamics of the system are:

$$\dot{x}_t = u_t \tag{29}$$

The rate of reinforcement to the learning system, $r(x_t, u_t)$, is $$r(x_t, u_t) = -x_t^2 - u_t^2 \tag{30}$$

Given some positive discount factor $\gamma < 1$, the goal is to maximize the total discounted reinforcement:

$$\int_0^\infty \gamma^t r(x_t, u_t) dt \tag{31}$$

A discrete-time controller can change its output every $\Delta t$ seconds, and its output is constant between changes. The discounted reinforcement received during a single time step is $$R_{\Delta t}(x_t, u_t) = \int_t^{t+\Delta t} \gamma^{\tau-t} r(x_\tau, u_\tau) d\tau = \int_t^{t+\Delta t} \gamma^{\tau-t}(-(x_t + \tau u_t)^2 - u_t^2) d\tau \tag{32}$$

and the total reinforcement to be maximized is $$\sum_{i=0}^\infty (\gamma^{\Delta t})^i R_{\Delta t}(x_{i\Delta t}, u_{i\Delta t}) \tag{33}$$

Given this control problem, it is possible to calculate the optimal policy $\pi^*(x)$, value function $V^*(x)$, Q value function $Q^*(x,u)$, and advantage function $A^*(x,u)$. These functions are linear or quadratic for all $\Delta t$ and $\gamma \leq 1$.

$$\pi^*(x) = -k_1 x \tag{34}$$

$$V^*(x) = -k_2 x^2 \tag{35}$$

$$Q^*(x,u) = -(k_2 + \Delta t k_1^2 k_3) x^2 - 2\Delta t k_1 k_3 xu - \Delta t k_3 u^2 \tag{36}$$

$$A^*(x,u) = -k_3(k_1 x + u)^2 \tag{37}$$

The constants $k_i$ are positive for all nonnegative values of $\Delta t$ and $\gamma \leq 1$. For $\Delta t = 0$ and $\gamma = 1$, all $k_i = 1$. Appendix B gives the general formula for each $k_i$ as a function of $\Delta t$ and $\gamma$.

Q-LEARNING WITH SMALL TIME STEPS

Figure 3:
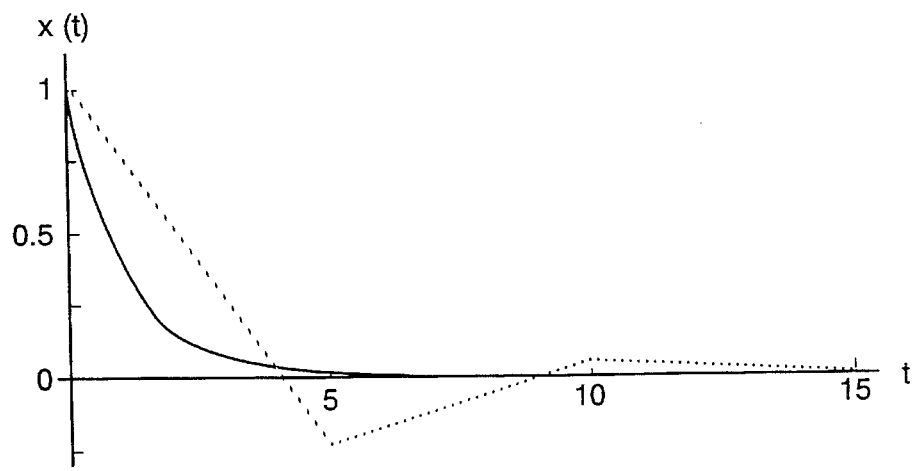
FIG. 3 is a graph showing the optimal trajectory for the linear quadratic regulator (LQR) problem, starting at $x_0=1$, for continuous time (solid line) and for discrete time with time steps of duration 5 (dashed line)

FIG. 3 is a graph showing the optimal trajectory for the linear quadratic regulator (LQR) problem, starting at $x_0=1$, for continuous time (solid line) and for discrete time with time steps of duration 5 (dashed line). In continuous time, the optimal speed is high when $x=1$, and the speed decreases as x approaches zero. In discrete time, the optimal speed is lower initially, to decrease the amount of overshoot on the first time step.

FIG. 3 illustrates the optimal trajectories for $\Delta t=5$ and $\Delta t=0$ (continuous time) with $\gamma=0.9$. At the first instant, the optimal policy for continuous time is to move at high speed, but the optimal policy for the discrete time system requires a lower speed in order to lessen the degree to which it will overshoot during the first time step. As the time step duration decreases from 5 to 0, the discrete-time trajectory converges to the continuous-time trajectory. The optimal value function and Q function are also affected by $\Delta t$. FIG. 4 shows the value functions, policy functions, and Q functions for $\Delta t=5$, $\Delta t=1$, and $\Delta t=0.0001$.

Figure 4A:
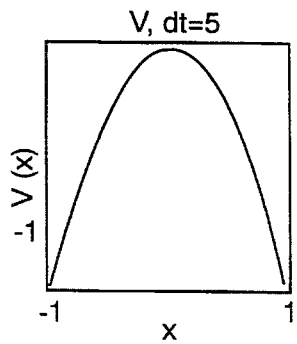
FIG. 4a, FIG. 4b and FIG. 4c are a set of diagrams showing the optimal value function V* for the LQR problem.
Figure 4B:
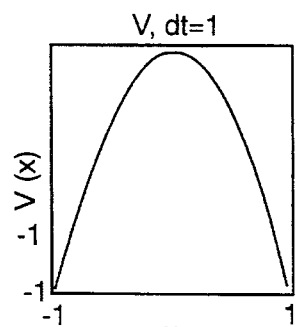
Figure 4C:
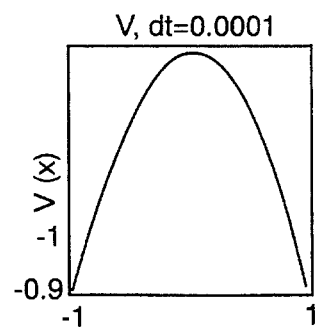
Figure 4D:
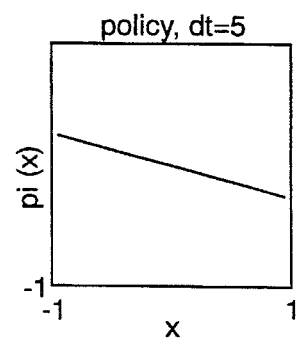
FIG. 4d, FIG. 4e and FIG. 4f are a set of diagrams showing policy* functions for the LQR problem.
Figure 4E:
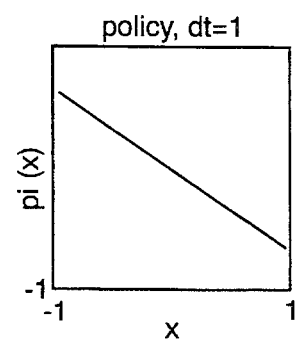
Figure 4F:
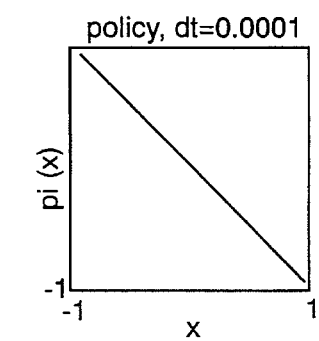
Figure 4G:
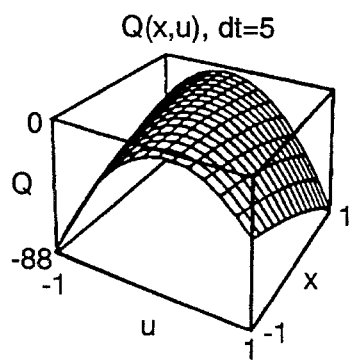
FIG. 4g, FIG. 4h and FIG. 4i are a set of diagrams showing Q function Q* for the LQR problem.
Figure 4H:
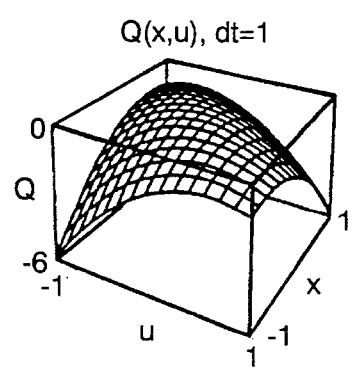
Figure 4I:
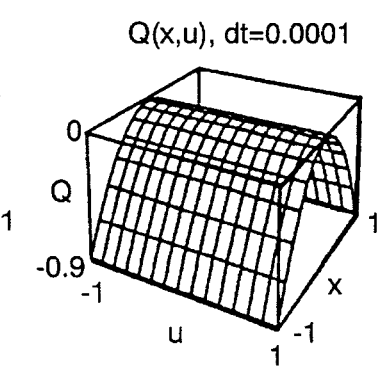

A set of diagrams showing the LQR problem optimal value function $V^*$ appears in FIG. 4a, FIG. 4b and FIG. 4c of the drawings. A set of diagrams showing the LQR problem policy $\pi^*$ function appears in FIG. 4d, FIG. 4e, and FIG. 4f of the drawings. A set of diagrams showing the LQR problem Q function $Q^*$ appears in FIG. 4g, FIG. 4h and FIG. 4i of the drawings. Functions are shown for time steps of duration 5 (left column or FIG. 4a, FIG. 4d and 4g), duration 1 (middle column or FIG. 4b, FIG. 4c, and FIG. 4h) and duration 0.0001 (right column or FIG. 4c, FIG. 4f and FIG. 4i). In all cases, y=0.9.

As the duration of the time step approaches zero, the optimal policy and value functions change slightly, approaching a linear and quadratic function respectively, with coefficients of 1.0. The change in the optimal Q function is more dramatic, however. This is visible in both the equations and the figures. If $\Delta t$ is set to zero in equation (36), the Q function ceases to be a function of u; it is only a function of x. This effect is also clear in the figures. For a time step duration of 5, it is obvious that for each possible state there is a unique action that yields the maximum Q value. This ridge of best Q values indicates the optimal policy. If the time step duration is decreased to 1, the Q function shifts so that the optimal policy is somewhat harder to see. It is still the case, though, that the maximum Q value in each state represents the optimal action in that state. As the time step approaches zero duration (continuous time), it becomes increasingly difficult to extract the policy from the Q function. In the last Q function graph in FIG. 4h, for each state, the Q function is almost constant over all the actions. There is a very small bump in the Q function corresponding to the optimal action in each state, but it is too small to be visible in a graph of the function, and it would be very difficult to learn, for a general function approximation system. Small errors in function approximation can cause large errors in the policy implied by the Q function. Q-learning is not practical for control when the time step duration is small, and Q-learning is theoretically impossible in a continuous-time system.

This difficulty is not specific to this particular control problem. A Q value is defined as the expected total discounted return if a given action is performed for only a single time step, followed by optimal actions thereafter. Unfortunately, in a typical control system, the total discounted reinforcement over an entire trajectory is rarely affected much by a bad control action on a single time step. Thus the Q function will be almost equal for all the actions in a given state, while exhibiting large differences between different states. This is why Q-learning is not well suited to problems with small time steps.

Figure 5A:
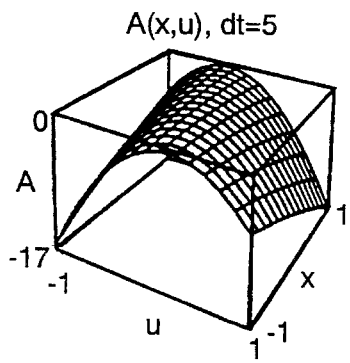
FIG. 5a is a diagram showing the optimal advantage function A* for the LQR problem for time steps of duration 5.
Figure 5B:
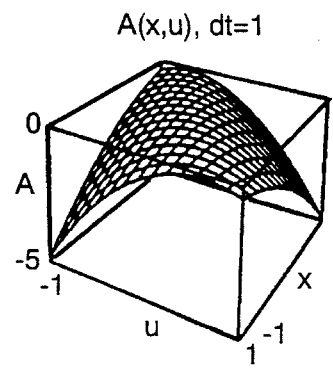
FIG. 5b is a diagram showing the optimal advantage function A* for the LQR problem for time steps of duration 1.
Figure 5C:
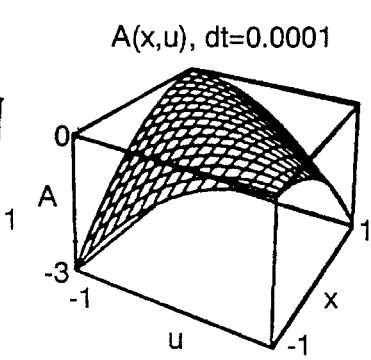
FIG. 5c is a diagram showing the optimal advantage function A* for the LQR problem for time steps of duration 0.0001.

FIG. 5a is a diagram showing the optimal advantage function $A^*$ for the LQR problem for time steps of duration 5. FIG. 5b is a diagram showing the optimal advantage function $A^*$ for the LQR problem for time steps of duration 1. FIG. 5c is a diagram showing the optimal advantage function $A^*$ for the LQR problem for time steps of duration 0.001. In all cases, $\gamma=0.9$. These diagrams show the advantage function for the same parameter values used in FIG. 4.

For large time step durations, such as $\Delta t=5$, the advantage and Q functions are almost identical except for scale. Both clearly represent the policy. For smaller time steps, the advantage function continues to clearly represent the policy and, even for continuous time, the optimal action in each state can be read easily from the graph. This suggests that the advantage updating algorithm, which is based upon storing values and advantages, might be preferable to Q-learning.

SIMULATION RESULTS

Figure 6:
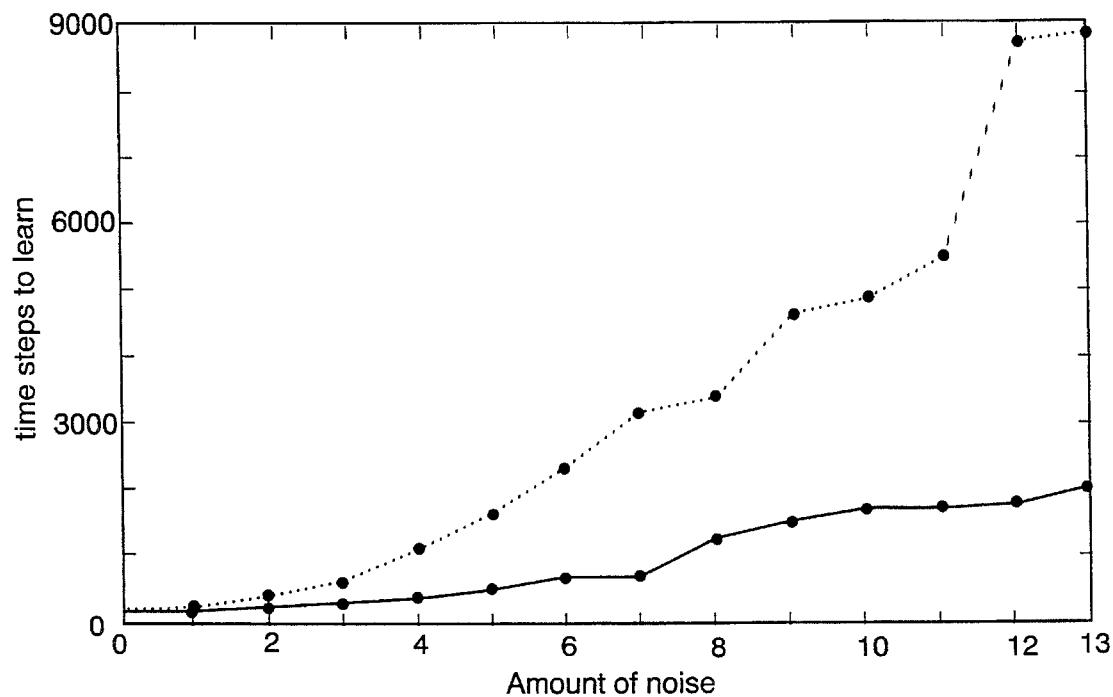
FIG. 6 is a graph showing time steps required for learning as a function of noise.
Figure 7:
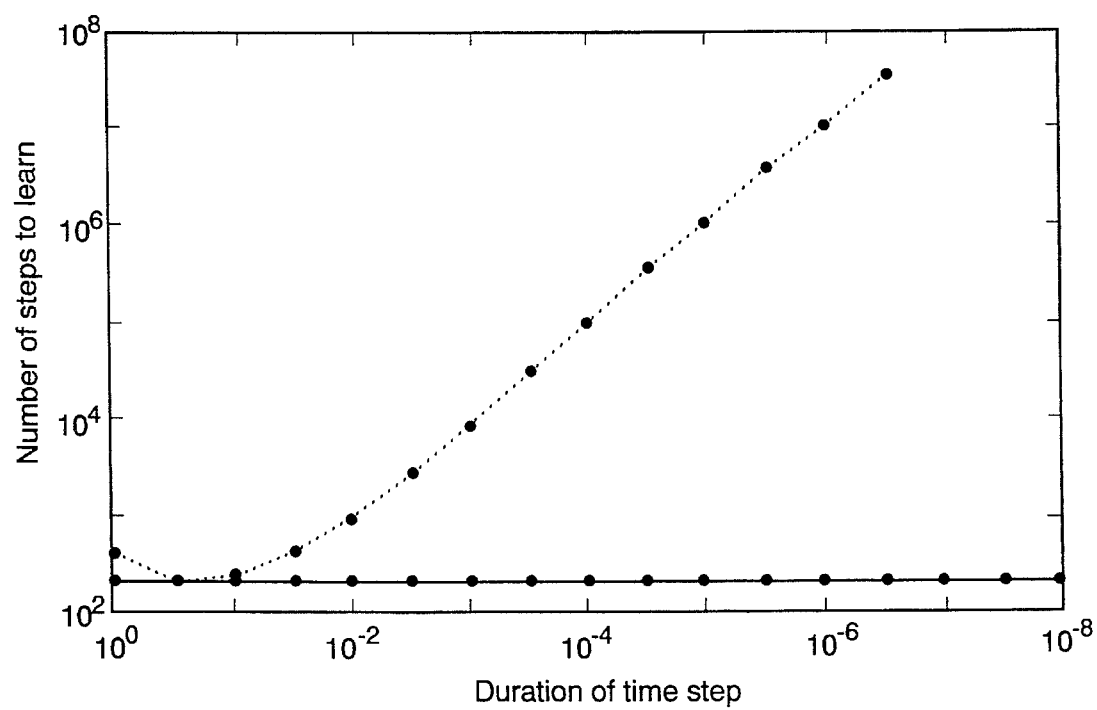
FIG. 7 is a graph showing time steps required for learning as a function of time step duration, $\Delta t$.
Figure 8:
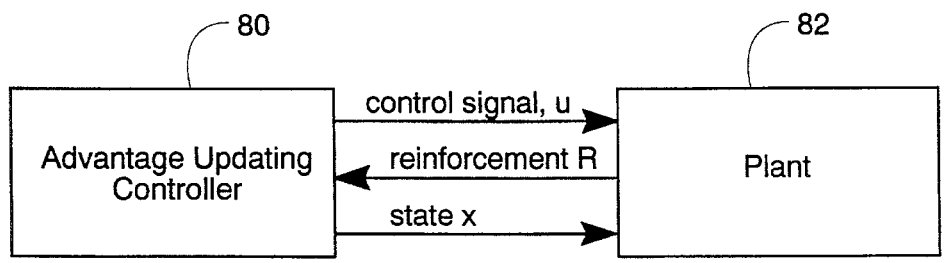
FIG. 8 is a block of an advantage update controller and a plant.
Figure 9:
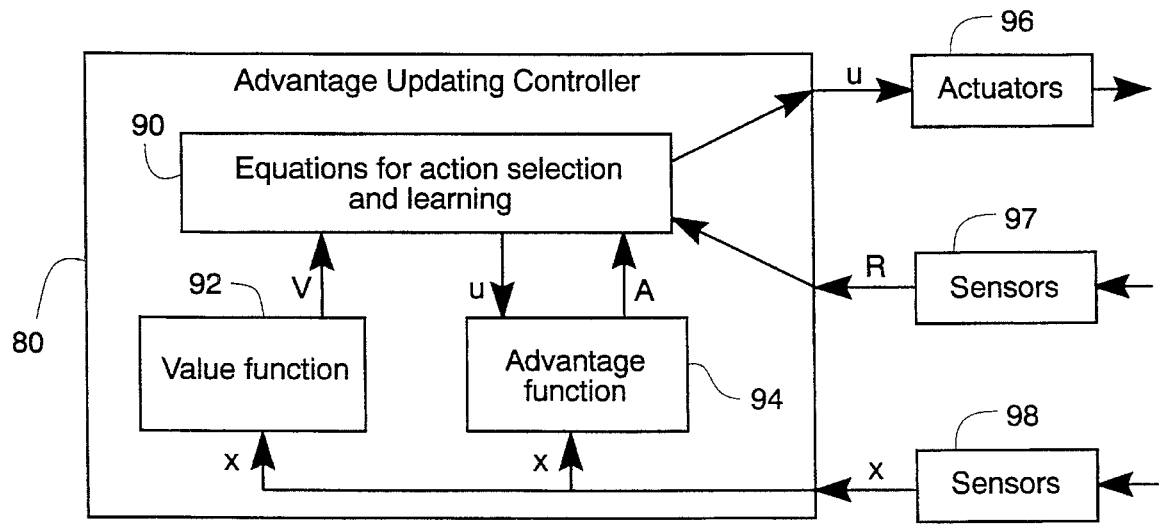
FIG. 9 is a block diagram of an advantage update controller.

Advantage updating and Q-learning were compared on the LQR problem described in the previous section. In the simulations, the V function was approximated by the expression $w_1x^2$, and the A and Q functions were approximated by $w_2x^2+w_3xu+w_4u^2$. All weights, $w_i$, were initialized to random values between $\pm 10^{-4}$, and were updated by simple gradient descent. Each Q function was initialized with the same weights as the corresponding advantage function to ensure a fair comparison. The control action chosen by the learning system was constrained to lie in the range $(-1,1)$. When calculating the maximum A or Q value in a given state, only actions in this range were considered. On each time step, a state was chosen randomly from the interval $(-1,1)$. With probability 0.5, an action was also chosen randomly and uniformly from that interval. With probability 0.5, the learning system chose an action according to its current policy. The advantage updating system also performed one normalization step on each time step in a state chosen randomly and uniformly from $(-1,1)$. A set of 100 Q-learning systems and 100 advantage updating systems were allowed to run in parallel, all initialized to different random values, and all exploring with different random states and actions. At any given time, the policy of each system was a linear function. The absolute value of the difference between the constant in the current policy and the constant in the optimal policy was calculated for each of the 200 learning systems. For Q-learning and advantage updating, the solution was said to have been learned when the mean absolute error for the 100 learning systems running in parallel fell below 0.001. FIG. 6 shows the number of time steps required for learning when various amounts of noise were added to the reinforcement signal. FIG. 7 shows the number of time steps required for learning with various time step durations.

FIG. 6 is a graph showing time steps required for learning as a function of noise. For a noise level of n, uniform, random noise from the range $(-n10^{-4}, n10^{-4})$ was added to the reinforcement on each time step. For each noise level, Q learning (dotted line) used the learning rate that was optimal to two significant digits. Advantage updating (solid line) used learning rates with one significant digit, which were not exhaustively optimized, yet it tends to require less time than Q learning to learn the correct policy to three decimal places. For zero noise, advantage updating is only slightly faster. For a noise level of 13, advantage updating is more than four times faster than Q learning.

FIG. 7 is a graph showing time steps required for learning as a function of time step duration, $\Delta t$. For each duration, Q learning (dotted line) used the learning rate that was optimal to two significant digits. Advantage updating (solid line) used learning rates with one significant digit, which were not exhaustively optimized. Advantage updating requires an approximately constant number of time steps to learn the correct policy to three decimal places, independent of $\Delta t$. For large $\Delta t$, advantage updating is slightly faster than Q-learning to learn the policy to three decimal places. For small $\Delta t$, advantage updating learns approximately 5 orders of magnitude more quickly than Q learning. As $\Delta t$ approaches zero, the training required by Q learning appears to grow without bound. Due to the time required for the simulations, the last two data points for Q learning were found with averages over 10 systems rather than 100.

Table 2 shown below shows the learning rates used for each of the three functions for both of the algorithms for various noise levels. In Table 2, there are 100 identical learning systems learning in parallel, with different initial random weights and different random actions. The Table 2 system is defined to have learned the policy when the mean absolute value of the error in the policy constant for the 100 systems is less than 0.001. The learning rates for Q learning are optimal to two significant digits. The learning rates for advantage updating have only a single significant digit, and have not been completely optimized.

Table 3 shows learning rates for various time step durations. Table 3 also represents 100 identical learning systems learning in parallel, with different initial random weights and different random actions. The system is defined to have learned the policy when the mean absolute value of the error in the policy constant for the 100 systems is less than 0.001. Results marked with "*" represent averages over 10 systems rather than 100. The learning rates for Q learning are optimal to two significant digits. The learning rates for advantage updating have only a single significant digit, and have not been completely optimized.

For the simulations described in Tables 2 and 3, normalization was done once after each learning update, and both types of update used the same learning rate. Advantage updating could be optimized by changing the number of normalizing updates performed per learning update, but this was not done here. One learning update and one normalizing update were performed on each time step. To insure a fair comparison for the two learning algorithms, the learning rate for Q-learning was optimized for each simulation. Rates were found by exhaustive search that were optimal to two significant digits. The rates for advantage updating had only a single significant digit, and were not exhaustively optimized. The rates used were sufficient to demonstrate that advantage updating learned faster than Q-learning in every simulation.

Advantage updating appears more resistant to noise than Q-learning, with learning times that are shorter by a factor of up to seven. This may be due to the fact that noise introduces errors into the stored function, and the policy for advantage updating is less sensitive to errors in the stored functions than for Q-learning. All of FIG. 6, and the leftmost points of FIG. 7, represent simulations with large time steps. When the time step duration is small, the difference between the two algorithms is more dramatic. In FIG. 7, as the time step duration $\Delta t$ approaches zero (continuous time), advantage updating is able to solve the LQR problem in a constant 216 time steps. Q-learning, however, requires approximately $10/\Delta t$ time steps. Simulation showed a speed increase for advantage updating by a factor of over 160,000. Smaller time steps might have resulted in a larger factor, but Q-learning would have learned too slowly for the simulations to be practical. Even for a fairly large time step of $\Delta t=0.03$, advantage updating learned twice as quickly as Q-learning. When $\Delta t=0.03$, the optimal policy reduces x by 90% in 81 time steps. This suggests that if a controller updates its outputs 50 times per second, then advantage updating will learn significantly faster than Q-learning for operations that require at least 2 seconds (100 time steps) to perform. Further research is necessary to determine whether this is true for systems other than a simple LQR problem.

TABLE 2

Learning rate constants and number of time steps required for learning, in the case of Q learning and advantage updating, with $\Delta t = 0.1$, and varying levels of noise.

| noise | $\alpha_Q$ | $\alpha$ | $\beta$ | $\omega$ | $t_Q$ | $t_A$ |
| --- | --- | --- | --- | --- | --- | --- |
| 0 | 1.4 | 1.0 | 0.3 | .5 | 239 | 214 |
| 1 | 1.4 | 1.0 | .3 | .5 | 272 | 222 |
| 2 | 0.74 | .6 | .3 | .3 | 415 | 286 |
| 3 | 0.44 | .5 | .3 | .3 | 660 | 375 |
| 4 | 0.26 | .4 | .3 | .4 | 1,128 | 445 |
| 5 | 0.17 | .3 | .2 | .3 | 1,688 | 561 |
| 6 | 0.11 | .2 | .4 | .1 | 2,402 | 755 |
| 7 | 0.088 | .2 | .2 | .2 | 3,250 | 765 |
| 8 | 0.073 | .1 | .1 | .07 | 3,441 | 1,335 |
| 9 | 0.054 | .1 | .09 | .05 | 4,668 | 1,578 |
| 10 | 0.050 | .1 | .1 | .06 | 4,880 | 1,761 |
| 11 | 0.046 | .08 | .06 | .06 | 5,506 | 1,761 |
| 12 | 0.030 | .06 | .1 | .1 | 8,725 | 1,832 |
| 13 | 0.028 | .06 | .1 | .1 | 8,863 | 1,845 |
| 14 | 0.022 | .06 | .1 | .1 | 11,642 | 1,850 |
| 15 | 0.018 | .06 | .1 | .1 | 13,131 | 1,890 |
| 16 | 0.018 | .06 | .1 | .1 | 13,183 | 1,902 |

TABLE 3

Optimal learning rate constants, a, and number of time steps required for learning, t, for Q-learning and advantage updating, with no noise, and varying time step durations, $\Delta t$.

| $\Delta t$ | $\alpha_Q$ | $\alpha$ | $\beta$ | $\omega$ | $t_Q$ | $t_A$ |
| --- | --- | --- | --- | --- | --- | --- |
| 1E0 | 0.44 | 1 | .6 | .4 | 382 | 196 |
| 3E-1 | 1.0 | 1 | .4 | .8 | 195 | 190 |
| 1E-1 | 1.4 | 1 | .3 | .5 | 239 | 214 |
| 3E-2 | 1.5 | .9 | .3 | .5 | 459 | 216 |
| 1E-2 | 1.6 | .9 | .3 | .5 | 1,003 | 216 |
| 3E-3 | 1.6 | .9 | .3 | .5 | 2,870 | 216 |
| 1E-3 | 1.5 | .9 | .3 | .5 | 9,032 | 216 |
| 3E-4 | 1.4 | .9 | .3 | .5 | 32,117 | 216 |
| 1E-4 | 1.4 | .9 | .3 | .5 | 96,764 | 216 |
| 3E-5 | 1.2 | .9 | .3 | .5 | 372,995 | 216 |
| 1E-5 | 1.3 | .9 | .3 | .5 | 1,032,482 | 216 |
| 3E-6 | 1.2 | .9 | .3 | .5 | 3,715,221 | 216 |
| 1E-6 | 1.2 | .9 | .3 | .5 | *10,524,463 | 216 |
| 3E-7 | 1.2 | .9 | .3 | .5 | *34,678,545 | 216 |
| 1E-7 | | .9 | .3 | .5 | | 216 |
| 3E-8 | | .9 | .3 | .5 | | 216 |
| 1E-8 | | .9 | .3 | .5 | | 216 |

CONVERGENCE OF ADVANTAGE UPDATING

There are three types of convergence that are desirable for an algorithm such as advantage updating. First, performing only learning updates should ensure that the policy implied by the advantage function should converge to optimality. Second, performing only normalizing updates should ensure that $A(x,u)$ becomes normalized, that is, $A_{max}(x)$ converges to zero in every state. Third, the full advantage updating algorithm (performing both types of updates) should ensure that $V(x)$, $A(x,u)$, $A_{max}(x)$ and the policy implied by $A(x,u)$ all converge to optimality. Theorem 1 and theorem 2, reproduced below, show how the first two types of convergence. The third type of convergence has not yet been shown to be false, but will require further analysis.

Theorem 1. A sequence of updates ensures that, with probability one, $V(x)$ converges to $V^*(x)$ and the value of the policy implied by $A(x,u)$ converges to optimality with probability one if:

(1) There are a finite number of possible states and actions.

(2) Each state receives an infinite number of learning updates and a finite number (possibly zero) of normalizing updates.

(3)

$$\sum_{n=1}^{\infty} \alpha_n(x,u) = \infty \text{ and } \sum_{n=1}^{\infty} \alpha_n^2(x,u)$$

is finite, where $a_n(x,u)$ is the learning rate used for the nth time the learning updates are applied to action u in state x.

(4) $\forall x, u \exists n_0$ such that $\forall n > n_0$ $\beta_n(x,u) = \alpha_n(x,u) \Delta t$ Proof:

If the above conditions are satisfied, then at some point in time during learning, $\beta = \alpha \Delta t$ and all future updates are learning updates (no normalizing updates). Define the function Q to be the left side of equation (27), so $Q(x,u) = V(x) + (A(x,u) - A_{max}(x)) \Delta t$. The learning updates in advantage updating change the quantity $Q(x,u)$ in the same way that Q-learning does when $\beta = \alpha \Delta t$. Therefore, Q will converge to $Q^*$ with probability one, which ensures that the value of the policy implied by the Q function will converge to optimality with probability one (Watkins 1989, Watkins and Dayan, 1992). Note that according to this definition of Q, the maximum Q value in state x always equals $V(x)$. Therefore, if Q converges to $Q^*$, then V must converge to $V^*$. In a given state, the action that maximizes Q will also be the action that maximizes A. The value of the policy implied by the Q function converges to optimality with probability one, therefore the value of the policy implied by the A function must also converge to optimality. □

Theorem 2. A sequence of updates ensures that $A_{max}(x)$ converges to zero with probability one in each state (the advantage function goes into normal form) if:

(1) There are a finite number of possible actions.

(2) Each state receives an infinite number of normalizing updates and a finite number (possibly zero) of learning updates.

(3) The learning rate a for each state is constant.

Proof:

Define the stored information after applying all the learning updates as the "initial" parameter values, so the learning updates can be ignored. Normalizing updates in one state are not affected by other states, so it is sufficient to consider a single state. First, consider the case where $A_{max}(x)$ is initially positive. Define S to be the sum of the positive advantages in state x. Note that a normalizing update cannot change the sign of $A_{max}(x)$, and cannot increase any advantage in state x. If a normalizing update is performed in state x on one of the positive advantages, then either S will be decremented by $A_{max}(x)$, or else one of the positive advantages will become nonpositive and will remain nonpositive after all future updates. If there are n possible actions, then the latter can happen at most n−1 times. The maximum of a set of positive numbers is greater than or equal to the average, so $A_{max}(x) \geq S/n$. Therefore, decreasing S by Amax(x) results in S being decreased by at least S/n. State x will always have at least one positive advantage, so each update has a probability of at least 1/n that it will update a positive advantage. An infinite number of updates will result in an infinite number of updates to positive advantages (with probability one), which results in S being decremented by at least S/n an infinite number of times, which causes S to converge to zero with probability one. The second case is if $A_{max}(x)$ is initially negative. In that case, each update has a probability of at least 1/n that $A_{max}(x)$ will be increased by at least $-A_{max}(x)$. With probability one, this will happen an infinite number of times, ensuring convergence with probability one. □

Theorem 1 indicates that the learning updates alone are sufficient to learn the optimal policy, when the advantage function is stored in a lookup table. However, the advantage function may be unnormalized, with large values in one state, and small values in another state. An unnormalized advantage function can be as difficult for a function approximation system to represent as a Q function, for similar reasons. Theorem 2 indicates that the normalizing update does tend to put the advantage function into normal form. Therefore a sequence containing both types of updates may converge to an advantage function that implies an optimal policy, and also is sufficiently normalized to be learned easily by a function approximation system. It appears possible to prove convergence for the full advantage updating algorithm, where both learning and normalizing updates are performed infinitely often for every state-action pair. A proof of this convergence result, based on the results of Jaakkola, Jordan, and Singh (1993), will appear in a forthcoming paper.

IMPLEMENTATION ISSUES

Many optimal control problems occurring in practice have continuous, high-dimensional state and action vectors. This suggests that the V and A functions should be represented with general function approximation systems that learn from examples, rather than using lookup tables. Possible systems might include a multilayer perceptron, a radial basis function network, a CMAC, or a memory-based learning system using k-nearest-neighbor interpolation. Such systems can be trained by giving examples of the value of a function for various inputs.

Continuous-time advantage updating requires knowledge of the rate of change of value, $\dot{V}(x_t)$. If the learning system is constantly calculating the value of V as the state changes, then simple filters and techniques from adaptive control theory can be used to estimate $\dot{V}(t)$ at a particular time t. In fact, the filter can even be noncausal, using the values of V at times later than time t as well as at times earlier than time t in the calculation of $\dot{V}(x_t)$. It is also acceptable for the estimate of $\dot{V}(t)$ to be somewhat noisy. As long as the noise has zero mean and bounded variance, this should not prevent convergence of the advantage updating algorithm to the correct policy, although noise would be expected to slow the convergence.

One additional issue arises when the action vector is continuous. All forms of dynamic programming require the calculation on each time step of a maximum (or minimum, or minimax saddlepoint). In Q-learning, for an update of a single parameter, it is necessary to find the maximum Q value in a particular state. Value iteration and policy iteration require the calculation of a sum or integral over all possible state transitions for a given action. This calculation must be repeated for each possible action in a given state, and the maximum of the calculated values must be found in order to update a single parameter. In advantage updating, for a single application of step 1 or step 2 above, the maximum A value in a given state must be found. If the state and action vectors are continuous, and the functions are stored (for example) in a single hidden layer sigmoidal network, then it is difficult to find the action that maximizes the output for a given state. There are three approaches to finding this maximum.

The first approach is to find maximizing action through traditional search techniques, treating the stored function as an unknown function to be sampled repeatedly while trying to find the maximum. This can be computationally intensive and can be subject to problems with local maxima, especially in high-dimensional action spaces.

The second approach exploits the ability of advantage updating to work with small time steps. For example, an MDP might have a time-step duration of $\Delta t$, a state vector x, and a scalar action u which is a real number between zero and one. An almost-equivalent MDP is one with a time-step duration of $\Delta t/100$, a state vector (x,u), and only two possible actions: increase u by $\frac{1}{100}$, or decrease u by $\frac{1}{100}$. The latter MDP is almost equivalent to the former; given an optimal policy for the latter MDP, an approximately optimal action for state x in the former MDP can be found through at most 100 evaluations of the policy for the latter MDP. In the limit, using large factors instead of 100, this approach reduces the problem of continuous actions to an equivalent problem with discrete actions. The algorithm for this maximization method in the limit is given in Baird (1992).

The third approach to finding maxima of learned functions is the wire fitting approach, described in Baird and Klopf (1993b). It is possible to take any function approximation system and embed it in a larger system which makes trivial the problem of finding the global maximum for each state. The maximum of the function in a given state can be found in constant time. This approach appears general, and less computationally intensive than the one in Baird (1992), and has been shown to work well on a simple cart-pole control problem.

CONCLUSION

Advantage updating is shown to learn slightly faster than Q-learning for problems with large time steps and no noise, and far more quickly for problems with small time steps or noise. Advantage updating works in continuous time, which Q-learning cannot do. Advantage updating also has better convergence properties than R-learning, differential dynamic programming, or algorithms based on stored change in value or stored policies. Complete learning systems for continuous states, actions, and time can be built using this algorithm with existing function approximation systems, function maximization systems, and filter systems. Unlike differential dynamic programming or value iteration, it is possible for advantage updating to learn without a model. If a model is known or learned, advantage updating may be combined with the model as in Dyna (Sutton, 1990a). If the system being controlled is stochastic, this direct method combined with the model could be more efficient than an indirect method combined with the model. This is due to the fact that some indirect methods require maximization over infinite sets of integrals in order to accomplish a single update, whereas advantage updating can accomplish the calculation of both the integrals and the maximization incrementally. Future work will include analysis of additional convergence issues, and application of advantage updating to more difficult problems.

ACKNOWLEDGMENTS

This research was supported under Task 2312R1 by the Life and Environmental Sciences Directorate of the United States Air Force Office of Scientific Research.

APPENDIX A

| NOTATION | |
| --- | --- |
| $x_t$ | State at time t |
| $u_t$ | Control action at time t. In discrete-time control, action is constant throughout a time step. |
| $r_{\Delta t}(x_t, u_{\Delta t})$ | Rate of reinforcement at time t while performing action $u_t$ in state $x_t$. |
| $R_{\Delta t}(x, u)$ | Total discounted reinforcement during a single time step starting in state x with constant action u. R is the integral of r as time varies over a single time step. |
| $R(x, u)$ | Information stored by R-learning for the state-action pair (x, u). |
| $\pi^*(x)$ | Optimal control action to perform in state x. |
| $V^*(x)$ | Total discounted reinforcement over all time if starting in state x then acting optimally. |
| $Q^*(x, u)$ | Total discounted reinforcement over all time if starting in state x, doing u, then acting optimally. |
| $\Delta V^*(x, u)$ | Expected value of $V^*(x') - V^*(x)$, where x' is the state reached by performing action u in state x. |

APPENDIX A-continued

| NOTATION | |
| --- | --- |
| $A^*(x, u)$ | Amount by which action u is better than the optimal action in maximizing total discounted reinforcement over all time. $A^*$ is zero for optimal actions, negative for all other actions. |
| $\pi, V, Q, A, \Delta V$ | Learning system's estimates of $\pi^*, V^*, Q^*, A^*,$ and $\Delta V^*$. |

All parameter updates are represented by arrows. When a parameter is updated during learning, the notation $$W \leftarrow K \qquad (38)$$

represents the operation of instantaneously changing the parameter W so that its new value is K, whereas $$W \xleftarrow{\alpha} K \qquad (39)$$

represents a partial movement of the value of W toward K, which is equivalent to $$W_{new} \leftarrow (1-\alpha)W_{old} + \alpha K \qquad (40)$$

where the learning rate $\alpha$ is a small positive number.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

```
//////////////////////////////////////////////////////////////////////////////
// Advantage Updating & Q-Learning Comparison on a Linear Quadratic Regulator//
//          Capt. Leemon Baird, Wright Laboratory, WPAFB, OH                //
//          bairdlc@wL.wpafb.af.mil     2 Nov 93                            //
// This program runs several simulations of both Q-learning and advantage   //
// updating on a simple linear quadratic regulator (LQR) problem.           //
// The names of weights start with "w". The functions of the weights are:   //
//          Q(x,u)=wqxx*x^2 + wqxu*x*u + wquu*u^2                           //
//          A(x,u)=waxx*x^2 + waxu*x*u + wauu*u^2                           //
//          V(x,u)=wav*x^2                                                  //
// The optimal weights:  wqxx=-k2-k3*k1*k1*dt  wqxu=-2*k3*k1*dt  wquu=-k3*dt//
//          wav=       waxx=(-k3*k1*k1)      waxu=-2*k3*k1     wauu=-k3    //
// Each line printed by the program has the time step duration (dt), number //
// of system simulated in parallel (nsys), learning rate for learning A, V, //
// normalizing A, and learning Q (aA,aV,aW,aQ), noise (N), and number of    //
// timesteps required for advantage updating and Q-learning to learn the    //
// policy with mean absolute error less than 0.001 (tA,tQ).                 //
////////////////////////////////////////////////////////////////////////////// include "stdio.h"
include "math.h"    #include "stdlib.h"

#define gamma      0.9    /* discount factor                                */
#define AU_sim     1      /* 1 to simulate advantage updating, 0 otherwise  */
#define Q_sim      0      /* 1 to simulate Q-learning, 0 otherwise          */
#define first_line 17     /* first simulation is this row of the array k[][]*/
#define last_line  17+26  /* last simulation is this row of array k[][]     */
#define mxs        100    /* max number of systems that can learn in parallel*/
#define dt         (k[c][0]) /* time step duration                          */
#define nsys       (k[c][1]) /* number of systems to simulate in parallel   */
#define alphaa     (k[c][2]) /* learning rate for learning A                */
#define alphav     (k[c][3]) /* learning rate for learning V                */
#define alphaw     (k[c][4]) /* learning rate for normalizing A             */
#define alphaq     (k[c][5]) /* learning rate for learning Q                */
#define noise      (k[c][6]) /* amount of random noise to add to reinforcement*/
#define R(x,u)     ((2*gd1*u*u+2*u*ln*(u*dt*gd-gd1*x) + \
                    ln2*((gd1-dt*dt*gd)*u*u+gd1*x*x-2*dt*gd*u*x))/ln3)
// do action u in state x, discounted reinforcement for one time step=R(x,u).

void    init_w    (void);    // initialize the weights
void    update_av (void);    // perform one step of advantage updating
void    update_q  (void);    // perform one step of Q-learning
void    avg_av    (void);    // find the mean |error| for A and V weights
void    avg_q     (void);    // find the mean |error| for Q weights double  rnd       (void);    // return a random number in the range [-1,1]
double  waxx[mxs],waxu[mxs],wauu[mxs],wav[mxs],wqxx[mxs],wqxu[mxs],wquu[mxs];
double  k1,k2,k3,gd,gd1,gd2,ln,ln2,ln3; //IEEE standard 80-bit floating point
long    c, t, s, donea, doneq;
char    back[13]={8,8,8,8,8,8,8,8,8,8,8,8,0}; //12 backspaces used for printing
unsigned long rnd_seed=1; // should be a 32-bit unsigned integer double k[100][7] = { //this defines the parameters for 61 different simulations
// dt    nsys    aA    aV    aW    aQ    noise    tA        tQ
```

A

```
1e-1, 100,  1.0, .3, .5, 1.4,    0, //   214         239           // 0
1e-1, 100,  1.0, .3, .5, 1.4,    1, //   222         272           // 1
1e-1, 100,  .6, .3, .3, .74,     2, //   286         415           // 2
1e-1, 100,  .5, .3, .3, .44,     3, //   375         660           // 3
1e-1, 100,  .4, .3, .4, .26,     4, //   445       1,128           // 4
1e-1, 100,  .3, .2, .3, .17,     5, //   561       1,688           // 5
1e-1, 100,  .2, .4, .1, .11,     6, //   755       2,402           // 6
1e-1, 100,  .2, .2, .2, .088,    7, //   765       3,250           // 7
1e-1, 100,  .1, .1, .07, .073,   8, //  1335       3,441           // 8
1e-1, 100,  .1, .09,.05, .054,   9, //  1578       4,668           // 9
1e-1, 100,  .1, .1, .06, .050,  10, //  1761       4,880           //10
1e-1, 100,  .08,.06,.06, .046,  11, //  1761       5,506           //11
1e-1, 100,  .08,.3, .4, .030,   12, //  1643 #     8,725           //12
1e-1, 100,  .07,.3, .3, .028,   13, //  1736 #     8,863           //13
1e-1, 100,  .07,.1, .3, .022,   14, //  1825 #    11,642           //14
1e-1, 100,  .06,.2, .1, .018,   15, //  1880 #    13,131           //15
1e-1, 100,  .06,.2, .1, .018,   16, //  1881 #    13,183           //16
1e-1, 100,  .10,.2, .3, .028,   11, //  1736       8,863           //13
1e-1, 100,  .10,.2, .4, .028,   11, //  1736       8,863           //13
1e-1, 100,  .10,.2, .5, .028,   11, //  1736       8,863           //13
1e-1, 100,  .10,.3, .3, .028,   11, //  1736       8,863           //13
1e-1, 100,  .10,.3, .4, .028,   11, //  1736       8,863           //13
1e-1, 100,  .10,.3, .5, .028,   11, //  1736       8,863           //13
1e-1, 100,  .10,.4, .3, .028,   11, //  1736       8,863           //13
1e-1, 100,  .10,.4, .4, .028,   11, //  1736       8,863           //13
1e-1, 100,  .10,.4, .5, .028,   11, //  1736       8,863           //13
1e-1, 100,  .08,.2, .3, .028,   11, //  1736       8,863           //13
1e-1, 100,  .08,.2, .4, .028,   11, //  1736       8,863           //13
1e-1, 100,  .08,.2, .5, .028,   11, //  1736       8,863           //13
1e-1, 100,  .08,.3, .3, .028,   11, //  1736       8,863           //13
1e-1, 100,  .08,.3, .4, .028,   11, //  1736       8,863           //13
1e-1, 100,  .08,.3, .5, .028,   11, //  1736       8,863           //13
1e-1, 100,  .08,.4, .3, .028,   11, //  1736       8,863           //13
1e-1, 100,  .08,.4, .4, .028,   11, //  1736       8,863           //13
1e-1, 100,  .08,.4, .5, .028,   11, //  1736       8,863           //13
1e-1, 100,  .09,.2, .3, .028,   11, //  1736       8,863           //13
1e-1, 100,  .09,.2, .4, .028,   11, //  1736       8,863           //13
1e-1, 100,  .09,.2, .5, .028,   11, //  1736       8,863           //13
1e-1, 100,  .09,.3, .3, .028,   11, //  1736       8,863           //13
1e-1, 100,  .09,.3, .4, .028,   11, //  1736       8,863           //13
1e-1, 100,  .09,.3, .5, .028,   11, //  1736       8,863           //13
1e-1, 100,  .09,.4, .3, .028,   11, //  1736       8,863           //13
1e-1, 100,  .09,.4, .4, .028,   11, //  1736       8,863           //13
1e-1, 100,  .09,.4, .5, .028,   11, //  1736       8,863           //13

1e0 , 100,  1.0, .7, .4, .44,    0, //   194 #       382           //17
3e-1, 100,  1.0, .4, .8, 1.0,    0, //   190 #       195           //18
1e-1, 100,  1.0, .3, .5, 1.4,    0, //   214 #       239           //19
3e-2, 100,  .9, .3, .5, 1.5,     0, //   216 #       459           //20
1e-2, 100,  .9, .3, .5, 1.6,     0, //   216 #     1,003           //21
3e-3, 100,  .9, .3, .7, 1.6,     0, //   214 #     2,870           //22
1e-3, 100,  .9, .3, .7, 1.5,     0, //   215 #     9,032           //23
3e-4, 100,  .9, .3, .7, 1.4,     0, //   214 #    32,117           //24
1e-4, 100,  .9, .3, .7, 1.4,     0, //   214 #    96,764           //25
```

B

```
   3e-5, 100,    .9, .3, .7, 1.2,   0, //  214 #   372,995                       //26
   1e-5, 100,    .9, .3, .7, 1.3,   0, //  214 #1,032,482                        //27
   3e-6, 100,    .9, .3, .7, 1.2,   0, //  214 #3,715,221                        //28
   1e-6,  10,    .9, .3, .7, 1.2,   0, //  214#10,524,463 (nsys=100 for tA)      //29
   3e-7,  10,    .9, .3, .7, 1.2,   0, //  214#34,678,545 (nsys=100 for tA)      //30
   1e-7, 100,    .9, .3, .7,  0,    0, //  214 #                                 //31
   3e-8, 100,    .9, .3, .7,  0,    0, //  214 #                                 //32
   1e-8, 100,    .9, .3, .7,  0,    0};//  214 #                                 //33
main() {
  printf("\n  dt  nsys aA    aV    aW    aQ     N      tA         tQ\n");
  for (c=first_line;c<=last_line;c++) { //do several lines from the table
    init_w();            //init each parallel system with different weights
    rnd_seed=7;          //reseed the random number generator
    if (!AU_sim) printf ("                 ");    doneа=!AU_sim; doneq=!Q_sim;
    for (t=0;!donea;t++) { //do updates for nsys adv. upd. systems in parallel
       avg_av();
       for (s=0;s<nsys;s++) update_av();
    }
    rnd_seed=7; //reseed again so Q sim is the same when not doing the AU sim.
    for (t=0;!doneq;t++) { //do updates for nsys Q-learners running in parallel
       avg_q();
       for (s=0;s<nsys;s++) update_q();
    }
  }
  return(0);
} void init_w(void){ //initialize all the weights, print out the parameters
  double ss,ln22,eps=1e-10;
  donea=doneq=0;
  gd=pow(gamma,dt); gd1=1-gd; gd2=1-gd*gd;
  ln=log(gamma); ln2=pow(log(gamma),2); ln3=pow(log(gamma),3);ln22=ln2+2;
  ss=sqrt((2+ln2)*(2+ln2)*gd1*gd1-4*dt*dt*gd*ln2);
  k1=(2*gd-2*dt*ln-2-gd1*ln2+ss)/(2*gd2+4*dt*gd*ln2+gd2*ln2+gd1*ss)*gd1/dt;
  k2=(ln22*gd1*gd1-2*dt*dt*gd*ln2-gd1*ss)/2/dt/dt/gd/ln3;
  k3=-(ln22*gd2+4*dt*gd*ln+gd1*ss)/2/dt/ln3;
  rnd_seed=7;
  for (s=0;s<nsys;s++) {  //each of nsys parallel systems get different weights
    rnd();rnd();rnd();rnd(); //this is to keep compatability with older code
    wqxx[s]=eps*rnd();wqxu[s]=eps*rnd();wquu[s]=eps*rnd(); //initialize weights
  }
  rnd_seed=7; //reseed the generator so A function gets same weights as Q
  for (s=0;s<nsys;s++) {  //each of nsys parallel systems get different weights
    rnd();rnd();rnd();wav[s]=eps*rnd();
    waxx[s]=eps*rnd();waxu[s]=eps*rnd();wauu[s]=eps*rnd();
  }
  printf("%1.0e %3i %5.3f %5.3f %5.3f %5.3f %3.1f                 ",
         dt,(int)nsys,alphaa,alphav,alphaw,alphaq,noise);
} void avg_av(void) { //find the average error and print current time
  double piam, inf=0;
  for (s=piam=0;s<nsys;s++) { // find mean policy error
    piam+=fabs(k1-waxu[s]/2/wauu[s])/nsys;
```

C

```
      if (fabs(waxx[s])>1e9 || fabs(waxu[s])>1e9 ||
          fabs(wauu[s])>1e9 || fabs(wav[s])>1e9)
        inf=1; //if any weight blows up, then learning takes infinite time
    }
    if ((t/100)*100==t) printf("%s(%09ld) ",&back,t);
    if (piam<.001 && !donea) {
      donea=1;
      printf("%s%9ld            ",&back,t);
      if (doneq) printf("\n");
    }
    if (inf && !donea) {
      donea=1;
      printf("%s infinity          ",&back);
      if (doneq) printf("\n");
    }
  }
} void avg_q(void) { //find the average error and print current time
  double piqm, inf=0;
  for (s=piqm=0;s<nsys;s++) { //find mean policy error
    piqm+=fabs(k1-wqxu[s]/2/wquu[s])/nsys;
    if (fabs(wqxx[s])>1e9 || fabs(wqxu[s])>1e9 || fabs(wquu[s])>1e9)
      inf=1; //if any weight blows up, then learning takes infinite time
  }   if ((t/100)*100==t) printf("%s(%09ld) ",&back,t);
    if (piqm<.001 && !doneq) {
      doneq=1;
      printf("%s%9ld            \n",&back,t);
    }
    if (inf && !doneq) {
      doneq=1;
      printf("%s infinity        \n",&back);
    }
} void update_av(void) { //do both learning and normalizing
  double am1,am0,x1a,ra,a,v0,v1,x0,dv,ev,ea,ua,aum,da,am0n;
  x0=rnd();                              //pick initial state x0 and action ua
  if (rnd()>0)      ua=rnd();
  else if (wauu[s]<0)  ua=-waxu[s]*x0/2/wauu[s];
  else if (waxu[s]>0)  ua=1;
  else                 ua=-1;
  if (ua>1) ua=1; else if (ua<-1) ua=-1;
  x1a=x0+ua*dt;                          //x1 is state after doing ua in x0
  ra=R(x0,ua)+noise*rnd()/10000;         //ra is reinforcement + 0 mean noise
  a=waxx[s]*x0*x0+waxu[s]*x0*ua+wauu[s]*ua*ua; //a is A(x0,ua)
  v0=wav[s]*x0*x0;                       //v0 is V(x0)
  v1=wav[s]*x1a*x1a;                     //v1 is V(x1)
  if (wauu[s]>=0)   am0=waxx[s]*x0*x0+fabs(waxu[s]*x0)+wauu[s];
  else {
    aum=(-waxu[s]*x0/2./wauu[s]);
    if      (aum<-1.) aum=-1.;
    else if (aum> 1.) aum= 1.;
    am0=waxx[s]*x0*x0+waxu[s]*x0*aum+wauu[s]*aum*aum;
  }                  //am0 is Amax(x0) before the weights change
```

D

```
   if (wauu[s]>=0) am1=waxx[s]*x1a*x1a+fabs(waxu[s]*x1a)+wauu[s];
   else {
     aum=(-waxu[s]*x1a/2./wauu[s]);
     if       (aum<-1.) aum=-1.;
     else if (aum> 1.) aum= 1.;
     am1=waxx[s]*x1a*x1a+waxu[s]*x1a*aum+wauu[s]*aum*aum;
   }                          //am1 is Amax(x1) before the weights change
     da=(-v0+gd*v1+ra)/dt+am0; //desired output of advantage net is da
   ea=da-a;                    //error in output is ea
   waxx[s]+=ea*x0*x0*alphaa;   //change 3 weights of advantage net with LMS
   waxu[s]+=ea*x0*ua*alphaa;
   wauu[s]+=ea*ua*ua*alphaa;
     if (wauu[s]>=0)   am0n=waxx[s]*x0*x0+fabs(waxu[s]*x0)+wauu[s];
   else {
     aum=(-waxu[s]*x0/2./wauu[s]);
     if       (aum<-1.) aum=-1.;
     else if (aum> 1.) aum= 1.;
     am0n=waxx[s]*x0*x0+waxu[s]*x0*aum+wauu[s]*aum*aum;
   };                          //am0n is new Amax(x0) after the weights change
   dv=(am0n-am0)/alphaa+v0;    //desired output of value net is dv
   ev=dv-v0;                   //error in output is ev
   wav[s] +=ev*x0*x0*alphav;   //change the weight of the value net with LMS
   //-------------------------------- normalization --------------------------
   x0=rnd();ua=rnd();a=waxx[s]*x0*x0+waxu[s]*x0*ua+wauu[s]*ua*ua;
   if (wauu[s]>=0)   am0=waxx[s]*x0*x0+fabs(waxu[s]*x0)+wauu[s];
   else {
     aum=(-waxu[s]*x0/2./wauu[s]);
     if       (aum<-1.) aum=-1.;
     else if (aum> 1.) aum= 1.;
     am0=waxx[s]*x0*x0+waxu[s]*x0*aum+wauu[s]*aum*aum;
   };                          //am0 is Amax(x0) after the weights change
   da=a-am0;                   //desired output of advantage net is da
   ea=da-a;                    //error in output is ea
   waxx[s]+=ea*x0*x0*alphaw;//change 3 weights of advantage net with delta rule
   waxu[s]+=ea*x0*ua*alphaw;
   wauu[s]+=ea*ua*ua*alphaw;
} //end update_av void update_q(void) { //do Q learning
   double x0,x1q,rq,q,v0,v1,qm,uq,x1a,qum,dq,eq;
   x0=rnd();                           //pick initial state x0, and action uq
   if (rnd()>0)           uq=rnd();
   else if (wquu[s]<0)    uq=-wqxu[s]*x0/2/wquu[s];
   else if (wqxu[s]>0)    uq=1;
   else                   uq=-1;
   if (uq>1) uq=1; else if (uq<-1) uq=-1;
   x1q=x0+uq*dt;                       //x1q is new state after doing uq in x0
   rq=R(x0,uq)+noise*rnd()/10000;      //rq is reinforcement + zero mean noise
   q=wqxx[s]*x0*x0+wqxu[s]*x0*uq+wquu[s]*uq*uq;//q is Q(x0,uq)
   v0=wav[s]*x0*x0;                    // v0 is Qmax(x0)
   v1=wav[s]*x1a*x1a;                  // v1 is Qmax(x1)
   if (wquu[s]>=0)   qm=wqxx[s]*x1q*x1q+fabs(wqxu[s]*x1q)+wquu[s];
   else {
     qum=(-wqxu[s]*x1q/2./wquu[s]);
```

E

```
      if    (qum<-1.) qum=-1.;
      else if (qum> 1.) qum= 1.;
      qm=wqxx[s]*x1q*x1q+wqxu[s]*x1q*qum+wquu[s]*qum*qum;
    }                        //qm is Qmax(x1) before the weights change
    dq=gd*qm+rq;             //desired output of Q net is dq
    eq=dq-q;                 //error in output is eq
    wqxx[s]+=eq*x0*x0*alphaq;//change 3 weights of Q net with delta rule
    wqxu[s]+=eq*x0*uq*alphaq;
    wquu[s]+=eq*uq*uq*alphaq;
} //end update_q double rnd() { //return a random double in the range [-1,1]
  rnd_seed = rnd_seed * 1103515245 + 12345;
  return (2.*(double)((rnd_seed>>16)&32767)/(double)32767-1.);
} //rnd_seed should be a 32-bit unsigned integer
```

F

What is claimed is:

1. A learning controller comprising:

means for storing a value function V and an advantage function A in a function approximation memory system;

means for updating said value function V and said advantage function A according to reinforcements received from an environment;

said means for updating including learning means for performing an action $u_t$ in a state $x_t$, leading to a state $x_{t+\Delta t}$ and a reinforcement $R_{\Delta t}(x_t,u_t)$;

said means for updating also including means for updating said advantage function A, and changing a maximum value, $A_{max}$, thereof;

said means for updating also including means for updating said value function V in response to said $A_{max}$ value change;

means for normalizing update of said advantage function A, by choosing an action u randomly, with uniform probability; and means for performing said action u and said normalizing update of said advantage function A in a state x;

said learning means and said normalizing update functioning according to an algorithm of:

$$\left. \begin{array}{l} A(x_t, u_t) \xleftarrow{\alpha} A_{max}(x_t) + \dfrac{\gamma^{\Delta t}V(x_{t+\Delta t}) + R_{\Delta t}(x_t, u_t) - V(x_t)}{\Delta t} \\ V(x_t) \xleftarrow{\beta} V(x_t) + \dfrac{A_{max_{new}}(x_t) - A_{max_{old}}(x_t)}{\alpha} \end{array} \right\} \text{learning updates}$$

-continued $$\left. A(x, u) \xleftarrow{\omega} A(x, u) - A_{max}(x) \right\} \text{normalizing update}$$

where said $$X \xleftarrow{\alpha} Y$$

symbology represents a function-approximating supervised learning system, generating an output of X, being trained to generate a desired output of Y at a learning rate of a.

2. A learning controller according to claim 1, wherein said function approximation memory system comprises a lookup table, wherein said learning means updating and said normalizing update are equivalent to replacing an entry X in said table with the value (1–a) X+aY.

3. A learning controller according to claim 1, wherein for continuous time, said equations are determined by taking a mathematical limit as $\Delta t$ goes to zero, so said second two update equations remain unchanged, and said first update equation becomes:

$$A(x_t,u_t) \xleftarrow{\alpha} A_{max}(x_t) + \dot{V}(x_{t+\Delta t}) + V(x_t)\ln\gamma + r(x_t,u_t).$$

4. A learning controller according to claim 1, wherein said function approximation memory system comprises a multilayer perceptron neural network.

5. A learning controller according to claim 1, wherein said function approximation memory system comprises a radial basis function network.

6. A learning controller according to claim 1, wherein said function approximation memory system comprises a memory based learning system.

7. A method of learning, for a controller having means for storing a value function V and an advantage function A in a function-approximation memory, said method comprising the steps of:

updating said value function V and said advantage function A in response to reinforcement information received from an environment input;

said environment input including a learning state wherein performing an action $u_t$ in a state $x_t$, leads to a state $x_{t+\Delta t}$ and a reinforcement $R_{\Delta t}(x_t,u_t)$;

changing a stored maximum value $A_{max}$ of said advantage function A by updating said advantage function A;

updating said value function V in response to said $A_{max}$ value change;

normalizing said advantage function A by choosing an action u randomly, with uniform probability;

performing said action u and said normalizing update of said advantage function A in a state x; and performing said learning updates and said normalizing update in accordance with an algorithm of:

$$\left. \begin{array}{l} A(x_t, u_t) \xleftarrow{\alpha} A_{max}(x_t) + \dfrac{\gamma^{\Delta t}V(x_{t+\Delta t}) + R_{\Delta t}(x_t, u_t) - V(x_t)}{\Delta t} \\ V(x_t) \xleftarrow{\beta} V(x_t) + \dfrac{A_{max_{new}}(x_t) - A_{max_{old}}(x_t)}{\alpha} \end{array} \right\} \text{learning updates}$$

$$\left. A(x, u) \xleftarrow{\omega} A(x, u) - A_{max}(x) \right\} \text{normalizing update}$$

where said $$X \xleftarrow{\alpha} Y$$

symbology represents a function-approximating supervised learning system, generating an output of X, being trained to generate a desired output of Y at a learning rate of a.

8. A learning controller comprising:

means for storing a value function V and an advantage function A in a function approximation memory;

means for updating said value function V and said advantage function A in said function approximation memory according to reinforcement information received from an environment input;

said means for updating including learning means for performing an action $u_t$ in a state $x_t$, leading to a state $x_{t+\Delta t}$ and a reinforcement $R_{\delta t}(x_t,u_t)$;

said means for updating also including means for updating said advantage function A, and changing a maximum value, $A_{max}$, thereof;

said means for updating also including means for updating said value function V in response to said $A_{max}$ value change;

means for choosing a learning means action u randomly, with uniform probability and for normalizing said update of said advantage function A;

means for performing said action u and said normalizing update of said advantage function A in a state x;

one of said learning means update and said normalizing update being in accordance with a predetermined learning algorithm and a predetermined normalizing update algorithm respectively.

9. The learning controller of claim 8 wherein said learning means update and said normalizing update are each in accordance with predetermined algorithms.

10. The learning controller of claim 9 wherein said learning means update and said normalizing update are each in accordance with an algorithm of:

$$A(x_t, u_t) \xleftarrow{\alpha} A_{max}(x_t) + \frac{\gamma^{\Delta t} V(x_{t+\Delta t}) + R_{\Delta t}(x_t, u_t) - V(x_t)}{\Delta t} \Bigg\} \text{ learning updates}$$

$$V(x_t) \xleftarrow{\beta} V(x_t) + \frac{A_{max_{new}}(x_t) - A_{max_{old}}(x_t)}{\alpha}$$

$$A(x, u) \xleftarrow{\omega} A(x, u) - A_{max}(x) \Bigg\} \text{ normalizing update}$$

where said $$X \xleftarrow{\alpha} Y$$

symbology represents a function-approximating supervised learning system, generating an output of X, being trained to generate a desired output of Y at a learning rate of a.

* * * * *